United States Patent
Campbell et al.

(10) Patent No.: US 8,121,403 B2
(45) Date of Patent: Feb. 21, 2012

(54) METHODS AND SYSTEMS FOR GLYPH-PIXEL SELECTION

(75) Inventors: Richard J. Campbell, Camas, WA (US); Jon M. Speigle, Vancouver, WA (US); Ahmet Mufit Ferman, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1085 days.

(21) Appl. No.: 11/930,500

(22) Filed: Oct. 31, 2007

(65) Prior Publication Data

US 2009/0110320 A1 Apr. 30, 2009

Related U.S. Application Data

(60) Provisional application No. 60/983,819, filed on Oct. 30, 2007.

(51) Int. Cl.
*G06K 9/34* (2006.01)
(52) U.S. Cl. ......................... 382/164; 382/176
(58) Field of Classification Search .................. 382/173, 382/176, 180, 164, 181; 358/464
See application file for complete search history.

(56) References Cited

U.S. PATENT DOCUMENTS

| | | | |
|---|---|---|---|
| 5,157,740 A | 10/1992 | Klein et al. | |
| 5,293,430 A | 3/1994 | Shiau et al. | |
| 5,339,172 A | 8/1994 | Robinson | |
| 5,379,130 A | 1/1995 | Wang et al. | |
| 5,566,255 A | 10/1996 | Pavlidis | |
| 5,588,072 A | 12/1996 | Wang | |
| 5,649,025 A | 7/1997 | Revankar | |
| 5,696,842 A | 12/1997 | Shirasawa et al. | |
| 5,768,403 A | 6/1998 | Suzuki et al. | |
| 5,778,092 A | 7/1998 | MacLeod et al. | |
| 5,809,167 A | 9/1998 | Al-Hussein | |
| 5,852,678 A | 12/1998 | Shiau et al. | |
| 5,854,853 A | 12/1998 | Wang | |
| 5,867,277 A | 2/1999 | Melen et al. | |
| 5,900,953 A | 5/1999 | Bottou et al. | |
| 5,943,443 A | 8/1999 | Itonori et al. | |
| 5,946,420 A | 8/1999 | Noh | |
| 5,949,555 A | 9/1999 | Sakai et al. | |
| 5,956,468 A | 9/1999 | Ancin | |
| 6,084,984 A | 7/2000 | Ishikawa | |
| 6,175,427 B1 | 1/2001 | Lehmbeck et al. | |
| 6,175,650 B1 | 1/2001 | Sindhu et al. | |
| 6,178,260 B1 | 1/2001 | Li et al. | |
| 6,215,904 B1 | 4/2001 | Lavallee | |
| 6,233,353 B1 | 5/2001 | Danisewicz | |
| 6,246,791 B1 | 6/2001 | Kurzweil et al. | |

(Continued)

FOREIGN PATENT DOCUMENTS

JP 8125841 A 5/1996

(Continued)

OTHER PUBLICATIONS

Japanese Office Action—Japanese Patent Application No. 2008-226178—Mailing Date Mar. 23, 2010.

(Continued)

*Primary Examiner* — Jon Chang
(74) *Attorney, Agent, or Firm* — Kristine Elizabeth Matthews; David C. Ripma

(57) ABSTRACT

Aspects of the present invention are related to methods and systems for detecting glyph pixels in a digital image.

22 Claims, 15 Drawing Sheets

U.S. PATENT DOCUMENTS

| | | |
|---|---|---|
| 6,272,240 B1 | 8/2001 | Li et al. |
| 6,295,371 B1 | 9/2001 | Rucklidge et al. |
| 6,308,179 B1 | 10/2001 | Petersen et al. |
| 6,347,153 B1 | 2/2002 | Triplett et al. |
| 6,360,009 B2 | 3/2002 | Li et al. |
| 6,373,981 B1 | 4/2002 | de Queiroz et al. |
| 6,389,164 B2 | 5/2002 | Li et al. |
| 6,400,844 B1 | 6/2002 | Fan et al. |
| 6,473,522 B1 | 10/2002 | Lienhart et al. |
| 6,522,791 B2 | 2/2003 | Nagarajan |
| 6,577,762 B1 | 6/2003 | Seeger et al. |
| 6,594,401 B1 | 7/2003 | Metcalfe et al. |
| 6,701,010 B1 | 3/2004 | Katsuyama |
| 6,728,399 B1 | 4/2004 | Doll |
| 6,731,789 B1 | 5/2004 | Tojo |
| 6,731,800 B1 | 5/2004 | Barthel et al. |
| 6,766,053 B2 | 7/2004 | Fan et al. |
| 6,771,813 B1 * | 8/2004 | Katsuyama ............... 382/165 |
| 6,782,129 B1 | 8/2004 | Li et al. |
| 6,853,755 B2 | 2/2005 | Li |
| 6,859,204 B2 | 2/2005 | Curry et al. |
| 6,901,167 B2 | 5/2005 | Herley |
| 6,973,213 B2 | 12/2005 | Fan et al. |
| 6,990,235 B2 | 1/2006 | Katsuyama |
| 6,993,185 B2 | 1/2006 | Guo et al. |
| 7,027,647 B2 | 4/2006 | Mukherjee et al. |
| 7,079,687 B2 | 7/2006 | Guleryuz |
| 7,324,669 B2 | 1/2008 | Nakanishi et al. |
| 7,379,587 B2 | 5/2008 | Curry et al. |
| 2002/0031268 A1 | 3/2002 | Prabhakar et al. |
| 2002/0076103 A1 | 6/2002 | Lin et al. |
| 2002/0110283 A1 | 8/2002 | Fan et al. |
| 2002/0168105 A1 | 11/2002 | Li |
| 2003/0107753 A1 | 6/2003 | Sakamoto |
| 2003/0133612 A1 | 7/2003 | Fan |
| 2003/0133617 A1 | 7/2003 | Mukherjee |
| 2003/0156760 A1 | 8/2003 | Navon et al. |
| 2004/0001624 A1 | 1/2004 | Curry et al. |
| 2004/0083916 A1 | 5/2004 | Isshiki |
| 2004/0096102 A1 | 5/2004 | Handley |
| 2004/0165773 A1 | 8/2004 | Katsuyama |
| 2004/0190027 A1 | 9/2004 | Foster et al. |
| 2004/0190028 A1 | 9/2004 | Foster et al. |
| 2004/0205568 A1 | 10/2004 | Breuel et al. |
| 2005/0008221 A1 | 1/2005 | Hull et al. |
| 2005/0129310 A1 | 6/2005 | Herley |
| 2005/0180647 A1 | 8/2005 | Curry et al. |
| 2005/0226503 A1 | 10/2005 | Bailey et al. |
| 2006/0062454 A1 * | 3/2006 | Fan et al. ............... 382/164 |
| 2006/0133690 A1 | 6/2006 | Bloomberg et al. |
| 2006/0210159 A1 * | 9/2006 | Huang et al. ............. 382/173 |
| 2008/0130064 A1 * | 6/2008 | Sato ..................... 358/474 |
| 2008/0205753 A1 * | 8/2008 | Chen et al. ............. 382/165 |

FOREIGN PATENT DOCUMENTS

| | | |
|---|---|---|
| JP | 9186878 | 12/1996 |
| JP | 9093443 A | 4/1997 |
| JP | 2001052189 A | 2/2001 |
| JP | 2003016444 A | 1/2003 |
| WO | WO 2006/066325 A1 | 6/2006 |

OTHER PUBLICATIONS

Japanese Office Action—Japanese Patent Application No. 2008-226178—Mailing Date Jun. 15, 2010.

Japanese Office Action—Japanese Patent Application No. 2008-226177—Mailing Date Mar. 23, 2010.

USPTO Office Action—U.S. Appl. No. 11/930,486—Dated Dec. 10, 2010.

* cited by examiner

METHODS AND SYSTEMS FOR GLYPH-PIXEL SELECTION

RELATED REFERENCES

This application claims the benefit of U.S. Provisional Patent Application No. 60/983,819, entitled "Methods and Systems for Background Color Extrapolation and Glyph-Pixel Selection," filed on Oct. 30, 2007, said application is hereby incorporated by reference herein.

FIELD OF THE INVENTION

Embodiments of the present invention comprise methods and systems for determining glyph pixels in a digital image.

BACKGROUND

Many digital image processing enhancements that improve the visual quality of a digital image rely on the accurate identification of different image regions in the digital image. Additionally, accurate determination of various regions in an image is critical in many compression processes.

SUMMARY

Embodiments of the present invention comprise systems and methods for detecting glyph pixels in an image using a dynamic threshold.

Embodiments of the present invention comprise systems and methods for glyph pixels in an image in a forward scan and refining the pixel label during a backward scan.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention, but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Figure 1:
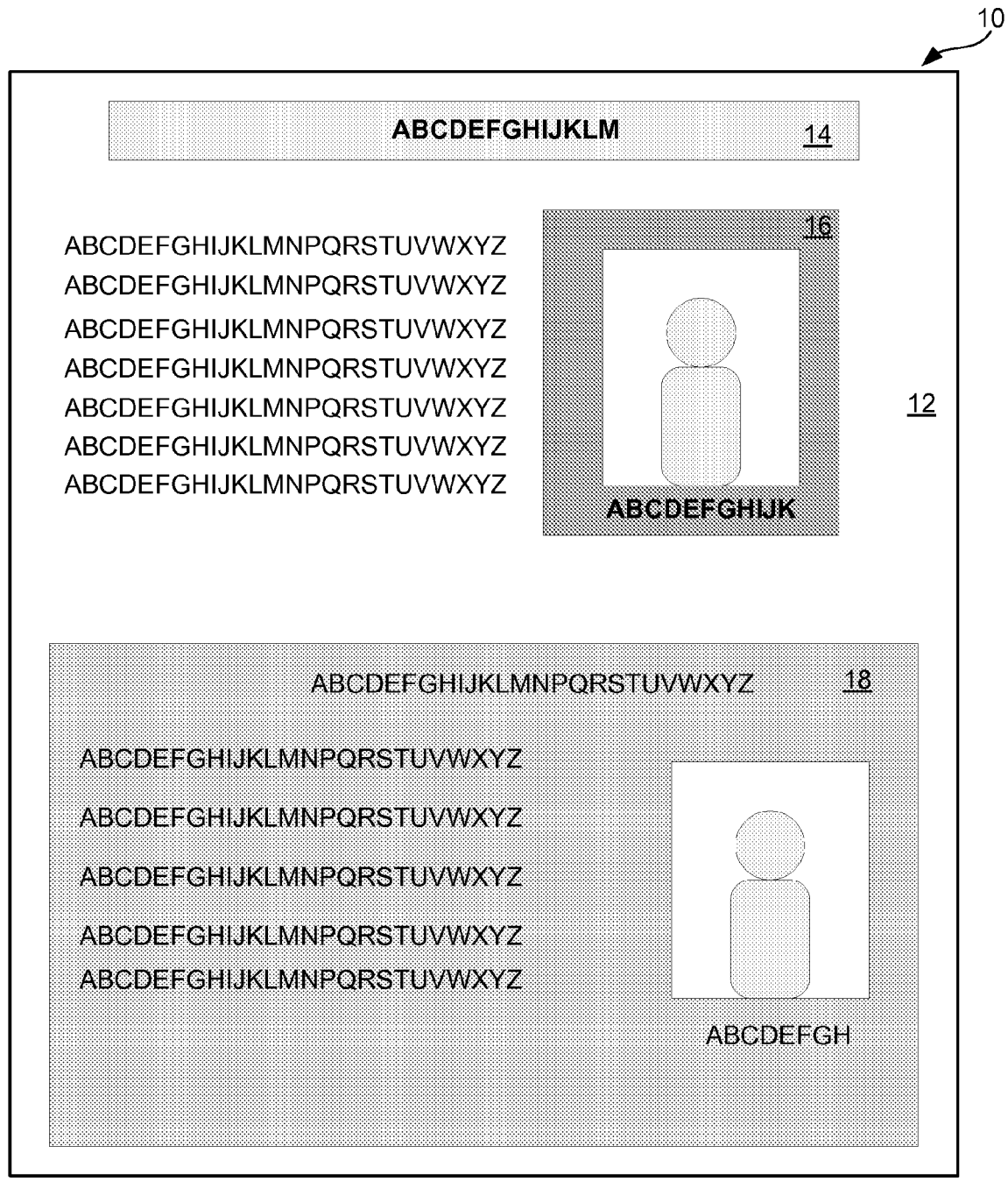
FIG. 1 depicts an exemplary digital image comprising a page background and three local background regions.

FIG. 1 shows an exemplary image 10. This exemplary image 10 may comprise several regions including: a page background region 12, a first local background region 14, a second local background region 16 and a third local background region 18. The page background region, also considered the global background region, may refer to the largely homogeneous region of the color of the paper on which an image may have been printed or the color of the background on which an electronically generated image may have been composed. A local background region may be a local region of homogeneous texture or color. Color may be described in any color space. Exemplary color spaces may include RGB, sRGB, CMYK, HSV, YUV, YIQ, CIE L*a*b*, YCbCr and other color spaces including gray-scale and luminance only color spaces.

Figure 2:
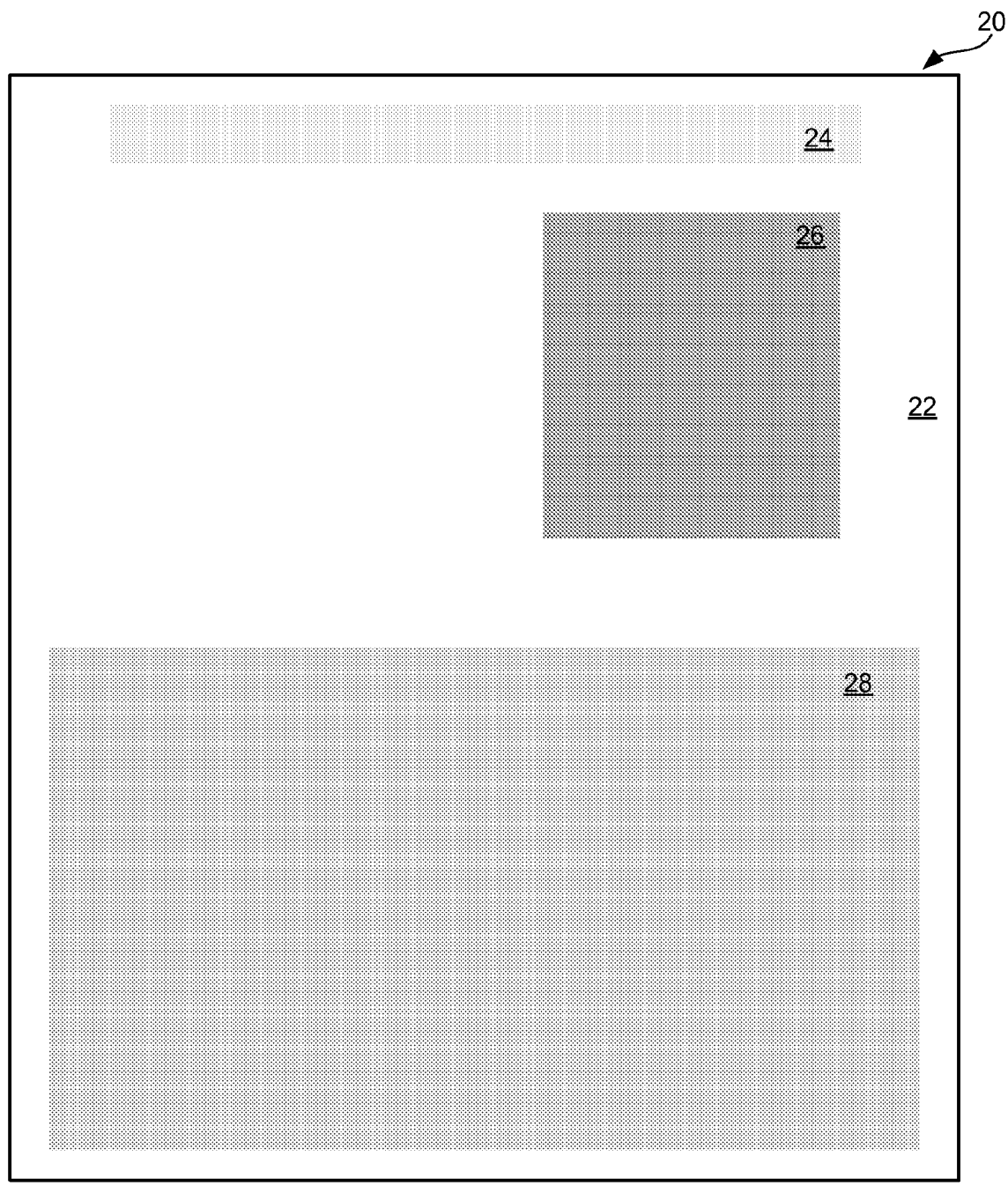
FIG. 2 depicts an exemplary background image corresponding to the exemplary digital image of FIG. 1.

FIG. 2 shows an exemplary background image 20 which may correspond to the exemplary image 10 shown in FIG. 1.

In a background image (for example, the background image 20 of FIG. 2), a background region may correspond to a background region in an associated image (for example, the image 10 of FIG. 1) with the non-background content removed and the "holes" left by the removed content filled with the appropriate local or page background. The page background region 22 in the exemplary background image 20 may correspond to the page background region 12 in the image 10. The first local background region 24 in the exemplary background image 20 may correspond to the first local background region 14 in the exemplary image 10. The second local background region 26 in the exemplary background image 20 may correspond to the second local background region 16 in the exemplary image 10. The third local background region 28 in the exemplary background image 20 may correspond to the third local background region 18 in the exemplary image 10. Determination of a background image may be desirable for image compression or image analysis.

Some embodiments of the present invention may comprise a limited-context raster method for estimating a background color at a location in a scanned, or otherwise generated, digital image.

In some embodiments of the present invention, background color estimation may be based on color averaging. In alternative embodiments, other color estimators may be used. Exemplary estimators may comprise those based on a median, a weighted average, a trimmed mean and other estimators.

Some embodiment of the present invention may comprise dominant-color summarization within a region.

Figure 3:
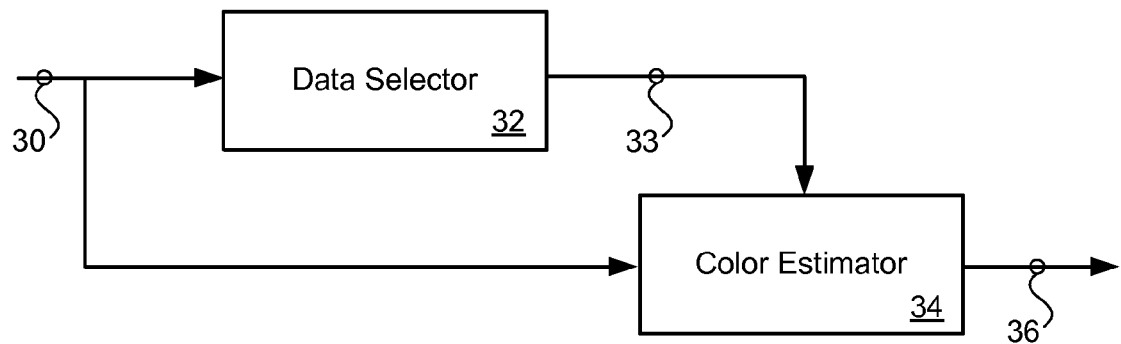
FIG. 3 is a diagram of embodiments of the present invention comprising a data selector and a color estimator.

Some embodiments of the present invention may comprise estimation of a background color at a pixel of interest based on image-data samples in a buffer, wherein the buffer may be populated by sampling a neighborhood of image data around the pixel of interest. These embodiments may be described in relation to FIG. 3. In these embodiments, a data selector 32 may select data from input image data 30. A color estimator 34 may estimate a background color 36 based on the selected data 33 and the image data 30. In some embodiments of the present invention, the data selector 32 may comprise an image data sampler which may sample image data in a sampling neighborhood proximate to the pixel of interest. In some embodiments of the present invention, the sampling neighborhood may be defined by an M×N rectangular window. In alternative embodiments of the present invention, the sampling neighborhood may comprise a circular region with radius r. Still alternative embodiments may comprise a causal buffer where new data elements may replace sequentially the least current samples so that the buffer may hold the most recent samples according to a sampling order.

Figure 4:
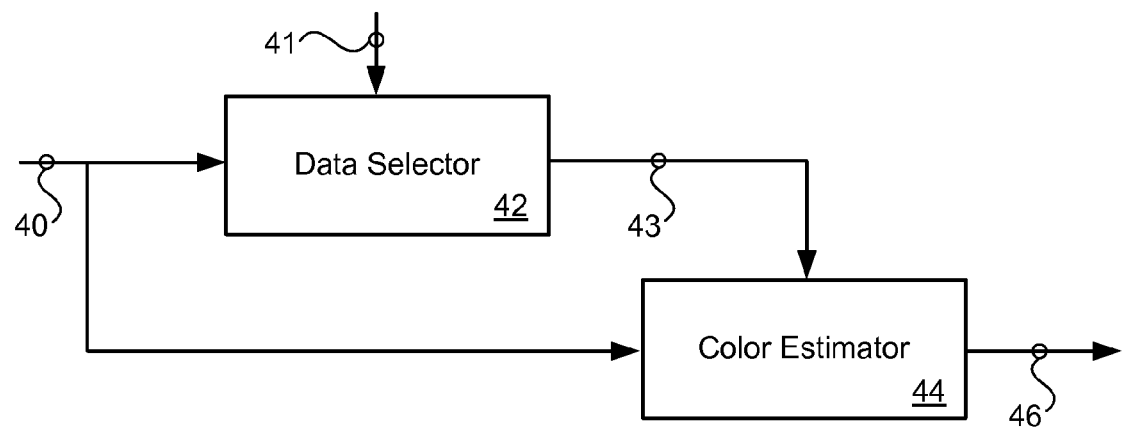
FIG. 4 is a diagram of embodiments of the present invention comprising a data selector, a color estimator and a selection criterion.

In some embodiments of the present invention described in relation to FIG. 4, pixels in the sampling neighborhood may be selectively added to the buffer according to a selection criterion. In these embodiments, a data selector 42 may perform data selection from input image data 40 according to a selection criterion 41. A color estimate 46 may be generated by a color estimator 44 based on the selected data 43 and the image data 40.

Figure 5:
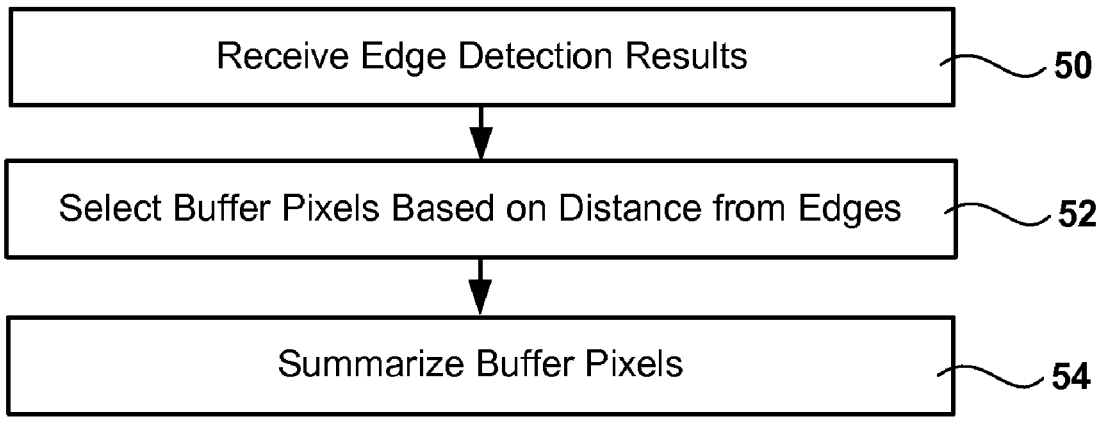
FIG. 5 is a chart showing embodiments of the present invention comprising selecting pixels for entry into a color buffer based on the distance of the pixel from an image edge.

In some embodiments of the present invention described in relation to FIG. 5, the selection criterion may be based on the output of an edge detection algorithm. Edge locations in the original image may be detected 50 based on any standard edge detection methods known in the art. Exemplary edge detection methods may comprise a Sobel edge detector, a Canny edge detector, a Prewitt edge detector and other edge detection methods. The edge locations may be used to identify pixels where sudden transitions in color and, likely, content (e.g., uniform background to text) occur. These transition pixels may be excluded 52 from entry in the color buffer. The background color may be estimated 54 based on the buffer data.

The use of edge detection results may prevent text colors in transition areas from contaminating the local background color estimate. However, the exclusion in the buffer of image data from edge locations may not reduce the negative effects of large font or bold text characters. Excluding the edge pixels from entry into the buffer may not exclude the interior pixels of large font characters from the averaging buffers used to estimate the background. For example, in the interior of large-type text, the color buffer may progressively be dominated by the text color, and the background color estimate may eventually converge to the text color if enough samples are gathered to fill the color buffer.

Figure 6:
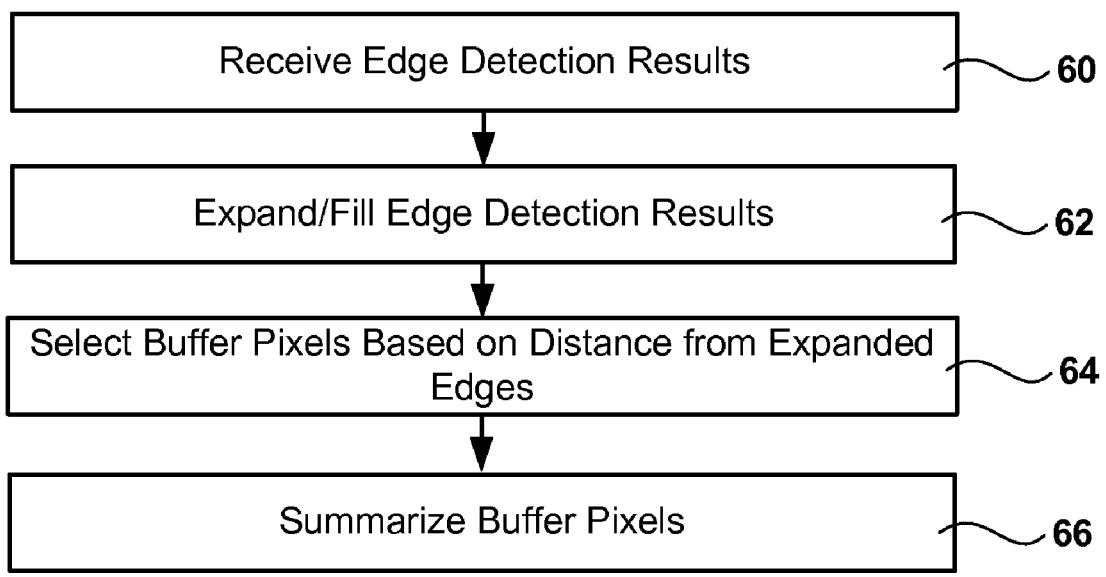
FIG. 6 is a diagram of embodiments of the present invention comprising filling and expanding edge detection results prior to using the edge detection results as a selection criterion.

To alleviate this problem, in some embodiments of the present invention described in relation to FIG. 6, after edge detection results are received 60, the edge boundaries of text characters may be filled or expanded 62 using image processing techniques. Exemplary image processing techniques for filling or expanding the edge boundaries include morphological closing, flood filling, dilation and other image processing techniques. The results of the filling/expanding process may be used to select 64 pixel data for entry in the buffer. The background color may be estimated 66 based on the buffer entries.

In some memory-limited embodiments of the present invention, filling and expanding may not be used.

In alternative embodiments of the present invention, an edge density measure based on a weighted, running difference of the number of edge pixels and non-edge pixels may be used as the selection criterion. This measure may attain a large value near an edge and may gradually decay as the distance from the edge increases. Pixels beyond a set distance away from any edge may be added to the color buffer and used in the background color estimate.

An edge density signal may be computed from an input edge signal. At each pixel in the input edge signal, a neighborhood may be defined. Within this neighborhood, a summary edge-density signal may be computed. An incoming edge signal may be combined with the neighborhood density signal to form the output edge density signal. Repeating this process over a sequence of image locations may be used to generate an edge density signal at the pixels of interest where a local background signal may be computed.

In some embodiments of the present invention, the edge density measure, edgeden, for each pixel in an input edge signal may be calculated using the following steps:

1. Initialize edgeden values to a known level.
2. Then, for each pixel, (i,j):
   a. Set edgeden(i,j) to the maximum of neighboring edgeden values: edgeden=max(neighboring edgeden).
   b. Update edgeden(i,j) value using the edge map:

$$edgenden(i, j) = \begin{cases} edgeden(i, j) + w_e, & \text{if edge pixel} \\ edgeden(i, j) - w_{decay}, & \text{otherwise,} \end{cases}$$

where $w_e$ may be the accumulation weight if the current pixel is an edge pixel and $w_{decay}$ may be the decay weight for non-edge pixels.

c. Clip negative values and saturate the count at a set maximum value:

$$edgeden(i, j) = \begin{cases} \text{count\_saturate}, & \text{if } edgeden(i, j) > \text{count\_saturate} \\ 0, & \text{if } edgeden(i, j) < 0 \\ edgeden(i, j), & \text{otherwise} \end{cases}$$

where count_saturate may be a preset threshold.

Through the parameters $w_{decay}$ and count_saturate, the edge density measure may control how far away from a highly-confident edge region a pixel must be before its image value may be added to the buffer and therefore influence the background color estimate. The parameter $w_e$ may control the rate at which the edge density measure may obtain highly-confident edge region verses sensitivity to noise in the edge detection. The longer the decay, the less likely interior glyph pixels for large or bold fonts will be added to the background color estimate. Conversely, the longer decay, the more pixels it will take for the background color estimate to converge to a new background color.

In some embodiments of the current invention, the edge data may be indexed first in left-to-right scan order to set edgeden values for a line, then the edge data may be indexed in right-to-left scan order to refine edgeden values. This may reduce the order dependence of the running sum and may decay the count from both sides of an edge.

In alternative embodiments of the current invention, a binary map of edge or text pixels may be received and pixels that may be labeled as edge or text pixels according to this binary map may be ignored in the background color summarization.

Figure 7:
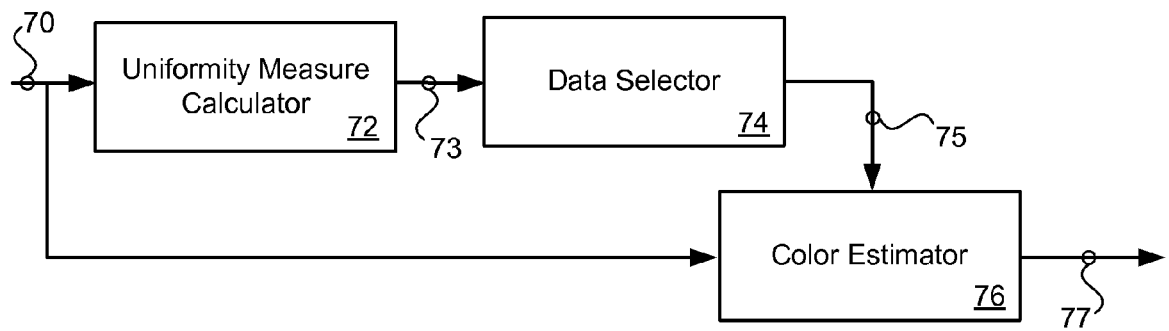
FIG. 7 is a diagram of embodiments of the present invention comprising a data selector, a color estimator and a uniformity measure calculator.

In alternative embodiments of the present invention described in relation to FIG. 7, a uniformity calculator 72 may calculate a uniformity measure which may be used to determine which pixels may be used for background estimation. The uniformity measure 73 may be calculated by the uniformity calculator 72 on input image data 70. The uniformity measure 73 may be used by a data selector 74 for selecting data to be used by a background color estimator 76 in background color estimation which may produce a background color estimate 77. Variance may be an exemplary uniformity measure. A uniformity measure may be negatively correlated to an edge measure, and the uniformity measure may have maxima in different spatial regions. In these embodiments of the present invention, pixels in uniform regions may be considered more-reliable samples for estimating local colors. In some embodiments of the present invention, the remaining pixels may be labeled as "unknown" and may be ignored by the estimation process. In alternative embodiments, the remaining pixels may be processed using an alternative criterion.

In some embodiments, the uniformity measure may be selected such that textured backgrounds may be labeled as "unknown." In alternative embodiments, the uniformity measure may be selected such that a textured region may be considered a background region.

Figure 8:
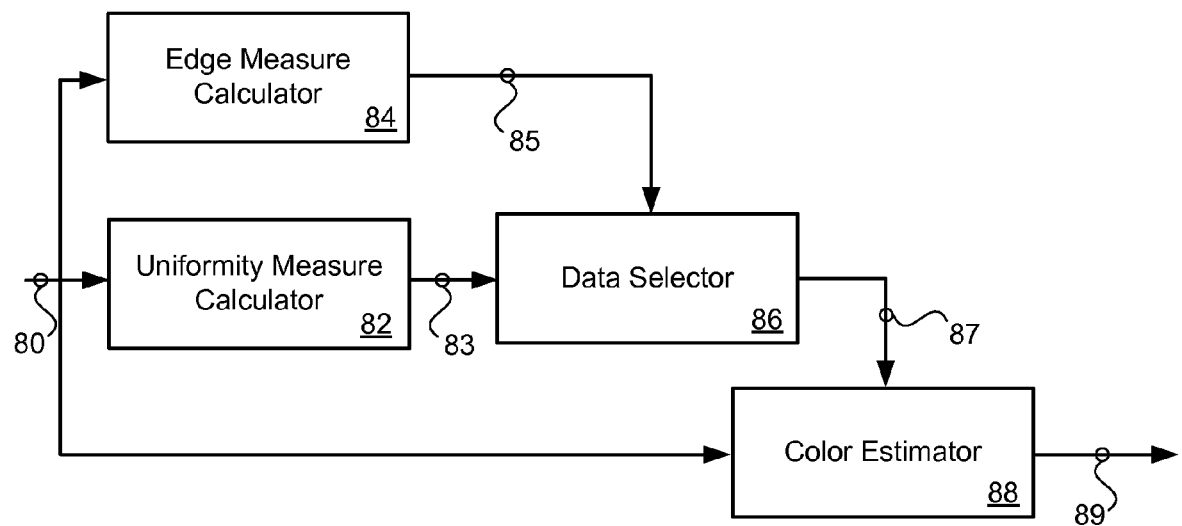
FIG. 8 is a diagram of embodiments of the present invention comprising a uniformity measure calculator and an edge measure calculator.

In some embodiments of the present invention described in relation to FIG. 8, pixels labeled as "unknown" and whose edge density measure, edgeden (i, j), is sufficiently low may be added to the color buffer and may be used to estimate background color. This may enable the background estimate to converge to a close approximation of a smooth (also considered slowly varying) textured, background region. In these embodiments, a uniformity measure calculator 82 and an edge measure calculator 84 may calculate, from the input image data 80, a uniformity measure 83 and edge measure 85, respectively. These measures may be used by a data selector 86 to determine data 87 from which a color estimator 88 may estimate a background color 89.

In some embodiments of the present invention, foreground pixels (for example, glyph pixels or text pixels) may be assumed to be darker than background pixels. Regions of glyph pixels and regions of text pixels exhibiting this relationship with their background pixels may be referred to as "normal-glyph" regions and "normal-text" regions, respectively. In alternative embodiments of the present invention, foreground pixels may be assumed to be lighter than background pixels. A region in which the local background color is darker than the glyph color or a region in which the local background color is darker than the text color may be referred to as a "reverse-glyph" region or a "reverse-text" region, respectively.

Figure 9:
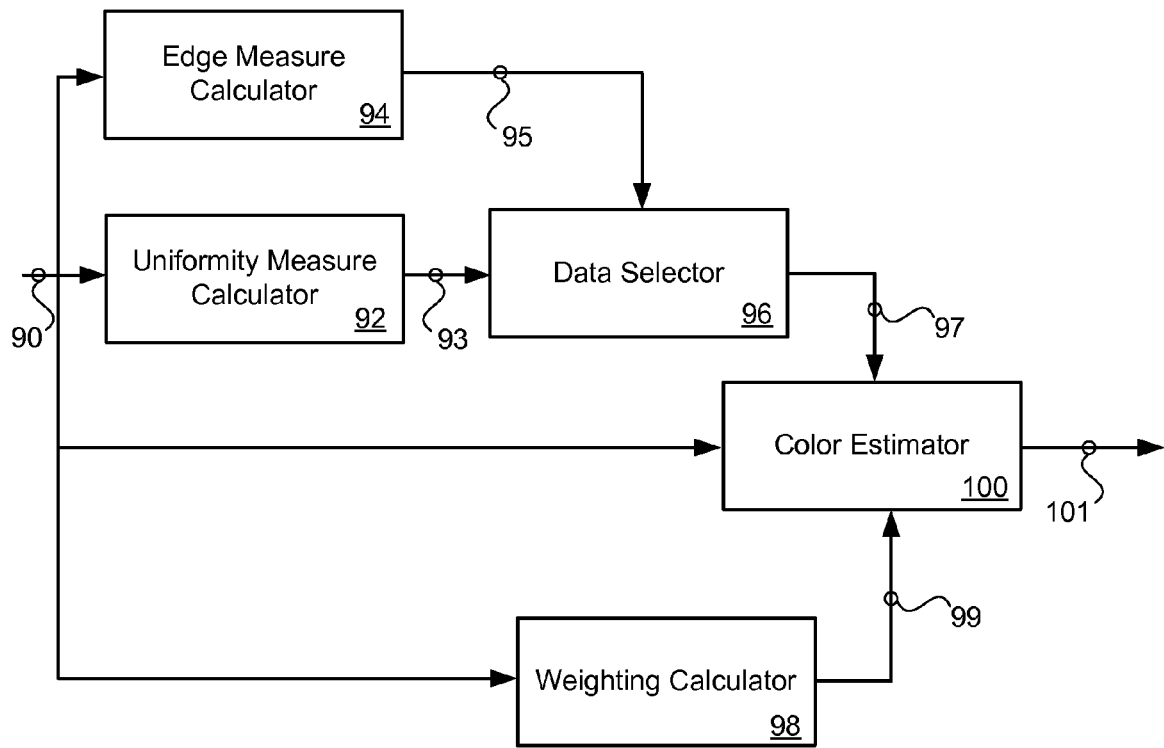
FIG. 9 is a diagram of embodiments of the present invention comprising a uniformity measure calculator, an edge measure calculator and a weighting calculator.

In some embodiments of the present invention described in relation to FIG. 9, a weighting signal 99 may be used by the color estimator 100. In an exemplary embodiment, the background color estimator 100 may compute a weighted running average, μ, wherein each value, $c_i$, in the buffer may have an associated weight, $w_i$, and where the weights sum to 1:

$$\mu = \frac{1}{K}\sum_{i=1}^{K} w_i c_i,$$

where K may be the buffer size.

In the exemplary embodiment shown in FIG. 9, a uniformity measure calculator 92 and an edge measure calculator 94 may calculate, from the input image data 90, a uniformity measure 93 and edge measure 95, respectively. These measures may be used by a data selector 96 to determine data 97 from which a color estimator 100 may estimate a background color 101. Each selected data 97 may be weighted according to a weighting factor 99 which may be determined by a weighting calculator 98.

In some embodiments of the present invention, in a region identified as a normal-text region, higher weightings may be applied to higher-lightness selected data values. In these embodiments, lower weightings may be applied to lower-lightness values, as these may more likely be lower-lightness foreground pixels.

In alternative embodiments of the present invention, in a region identified as a reverse-text region, higher weightings may be applied to lower-lightness selected data values. In these embodiments, higher weightings may be applied to higher-lightness values, as these may more likely be higher-lightness, reverse-text, foreground pixels.

Figure 10:
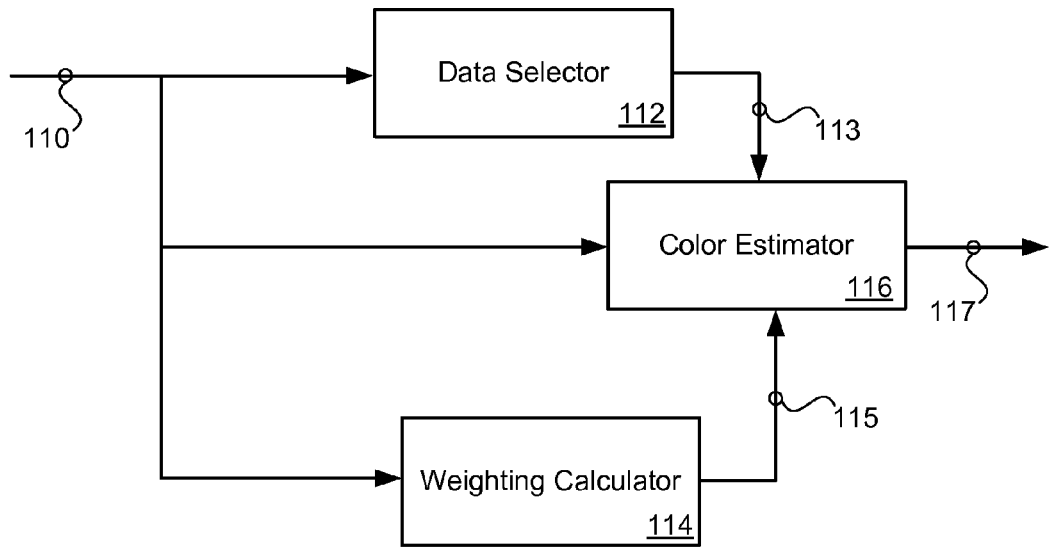
FIG. 10 is a diagram of embodiments of the present invention comprising a weighting calculator.

In some embodiments of the present invention described in relation to FIG. 10, a data selector 112 may select data from input data 110 for entry into a color summarization buffer. The selected data 113 may be used by a color estimator 116 in conjunction with data weightings 115 determined from the input data 110 by a weighting calculator 114 to determine a background color estimate 117.

In some embodiments of the present invention, input image data may be stream-based processed, and as data is passed through the system, limited context may be maintained to minimize memory usage and limit computation time. In these embodiments, a spatial pixel delay may be required to estimate a background color relative to the pixel of interest passing through the system.

Figure 11:
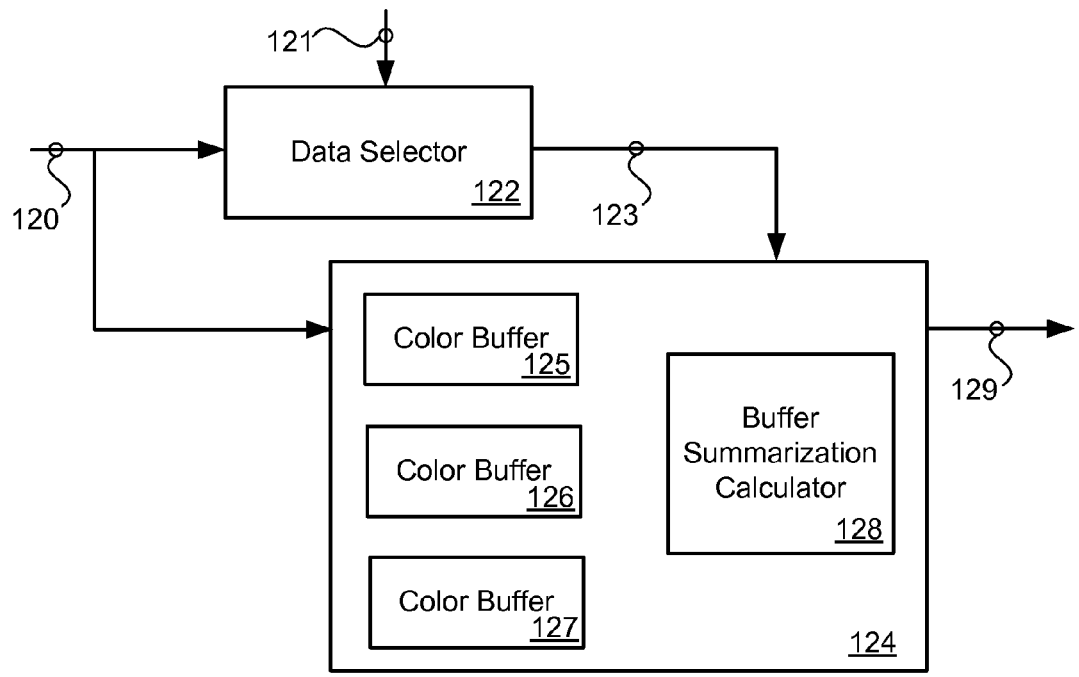
FIG. 11 is a diagram of embodiments of the present invention comprising multiple color buffers and color buffer selection based on non-local analysis.

In alternative embodiments, prior analysis may be performed to identify the major background colors in the input image. An exemplary method for identifying major background colors is disclosed in U.S. patent application Ser. No. 11/424,297, entitled "Methods and Systems for Segmenting a Digital Image into Regions," filed Jun. 15, 2006, which is hereby incorporated herein by reference in its entirety. In these alternative embodiments, a non-local signal may be used in selecting pixels for color summarization. In some embodiments, the major peaks in a global color histogram may be considered likely local background colors. A color buffer may be assigned for each major peak. During background color estimation, each pixel of interest may be analyzed to determine whether it is associated with a major peak. If the pixel of interest is associated with a major peak, then the buffer corresponding to that peak may be updated, and that buffer may be used to estimate the background color for the pixel of interest. These embodiments may be described in relation to FIG. 11.

In these embodiments, non-local color information 121 may be used by a data selector 122 to determine if an image data value 120 may be added to a color buffer (three shown) 125, 126, 127. The data selector 122 may determine a color-buffer selection signal 123. A background color estimator 124 may comprise a plurality of color buffers (three shown) 125, 126, 127 and a buffer summarization calculator 128. The buffer summarization calculator 128 may summarize the color data values of the selected color buffer 125, 126, 127. In some embodiments the buffer summarization calculator 128 may comprise a mean calculation, a trimmed-mean calculation, a median calculation, a weighted mean calculation, a weighted trimmed-mean calculation and other estimators. In some embodiments, the non-local color information may comprise peak color values derived from a histogram of the image data.

In some embodiments of the present invention, only pixels whose color is close to a major histogram peak may be added to a color buffer. In these embodiments, the spatial pixel delay required to converge to the local color value may decrease since the colors in the buffer may already be similar to the current pixel of interest.

In some embodiments of the present invention, image data may be buffered and processed multiple times using different scan directions in each processing pass. In some embodiments, multiple lines of a raster image data may be streamed into a processor or ASIC twice: first in raster order and subsequently in reverse raster order. The multiple background estimates determined from multiple processing of the image data may be reconciled to produce a single estimate at each pixel of interest. In one embodiment each estimate may be used by subsequent processes. In an alternative embodiment, the pixel estimate may be determined by choosing the color estimate closest to the color of the pixel.

Figure 12:
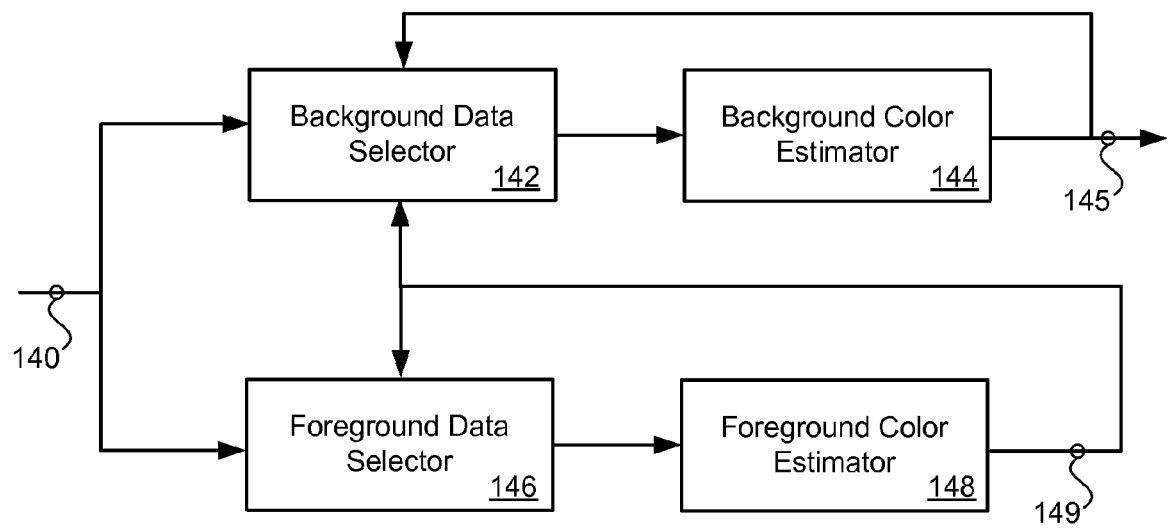
FIG. 12 is a diagram of embodiments of the present invention comprising a foreground color estimator.

In some embodiments of the present invention described in relation to FIG. 12, an estimate of the current foreground object color may be maintained and used in data selection. In these embodiments, if a pixel of interest color value matches the local foreground color estimate, then the pixel of interest color value may receive a lower weighting in the summarization method or the pixel value may be excluded from the background summarization buffers. Simultaneous estimation embodiments such as these may reduce the number of foreground pixels mistakenly added to the background summarization buffers. This may yield better background estimates, uncorrupted by the fringe pixels at boundaries between foreground and background regions.

In these embodiments, a background data selector 142 may select image data 140 based on a selection criterion that incorporates a current foreground color estimate 149. The selected data may be entered into a background color buffer from which a background color estimator 144 may produce an estimate of the background color 145. In some embodiments of the present invention, the background color estimator 144 may comprise a background color buffer and a buffer summarization calculator. In alternative embodiments of the present invention, the background color estimator 144 may comprise a plurality of color buffers wherein each color buffer may correspond to a peak in a color histogram of the image data 140. In these embodiments, the background data selector 142 may comprise a color-buffer selector. In some embodiments of the present invention, image data 140 that is close in color value to the current foreground color estimate 149 may not be selected by the background data selector 142 for entry into a color buffer. In alternative embodiments, image data 140 that is close in color value to the current foreground color estimate 149 may be weighted less heavily by the background color estimator 144 than image data 140 that is not close in color value to the current foreground color estimate 149.

In some embodiments of the present invention, the foreground color estimate 149 may be determined by a foreground color estimator 148 based on a summary of image color values in a foreground color buffer. A foreground data selector 146 may select image data values 140 that exhibit foreground characteristics for entry into the foreground color buffer.

In some embodiments of the present invention, color similarity may be measured using a distance measurement between color values. Exemplary color-distance measures may comprise an $L_1$ norm, an $L_2$ norm, a 2-dimensional city block distance measure between the chroma components of a luma-chroma-chroma color space representation, a 3-dimensional city block distance measure between the components of a 3-dimensional color space representation, a Euclidean distance measure, a weighted 2-dimensional city block distance measure between the chroma components of a luma-chroma-chroma color space representation, a weighted 3-dimensional city clock distance between the components of a 3-dimensional color space representation and other well-known-in-the-art distance measures.

In some embodiments of the present invention, which pixels contribute to a background estimation buffer may be restricted based on a criterion or combination of criterion as described above. In alternative embodiments of the present invention, each buffer entry may be associated with a weighting factor.

In some embodiments of the present invention, the background color estimator may comprise a summarization method which may be biased based on features computed from the background and/or foreground color estimates. In some exemplary embodiments, when the foreground color is lighter than the background estimate, which may occur in a reverse-text region, then the background estimate may be biased darker, and the foreground estimate may be biased lighter. In other exemplary embodiments, when the foreground color is darker than the background color, which may occur in a normal-text region; then the background estimate may be biased lighter, and the foreground estimate may be biased darker.

Some embodiments of the present invention may generate an estimate of a spatially-varying background color. In some embodiments of the present invention, the background estimate may be used in conjunction with a dynamic thresholding operation to segment text pixels from the background. An exemplary method for performing the glyph dynamic thresholding operation is disclosed in U.S. patent application Ser. No. 11/627,456, entitled "Methods and Systems for Detecting Character Content in a Digital Image," filed Jan. 26, 2007, which is hereby incorporated herein by reference in its entirety. This combined operation may be referred to as glyph generation and the output may be a binary mask associated with text or glyph pixels.

Exemplary uses for the final, also considered refined, binary mask, also considered a glyph or text mask, may include text enhancement algorithms and compound image coding. In a text-enhancement pipeline, the refined binary mask may identify text pixels which may be enhanced by contrast enhancement and noise removal operations. In an image compression pipeline, the refined binary mask may be used as a higher-resolution foreground representation while a non-glyph image may used to represent a lower-resolution background image.

In some embodiments of the present invention, a background color estimate, a binary glyph mask, a glyph color estimate and a binary mask that identifies pixels of neither glyph or background status, referred to as an "unknown" mask, may be generated. In some embodiments, these estimates may be made row-wise and may be streamed to subsequent processing modules or used to form resultant images.

Exemplary subsequent processing may comprise image compression techniques, palette color estimation of glyph pixels, hole-filling behind glyph pixels to form an output background image or text enhancement on the input image. In some embodiments of the present invention, subsequent processing may use a subset of the outputs enumerated above. In alternative embodiments of the present invention, subsequent processing may use all of the outputs enumerated above.

Figure 13:
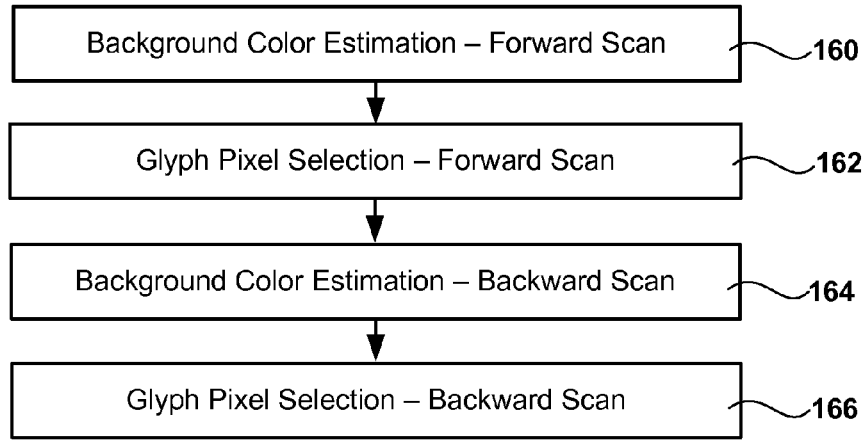
FIG. 13 is a diagram of embodiments of the present invention comprising two pass background color estimation and two pass glyph pixel selection.

In some embodiments of the present invention, a glyph generation process may use a double scan of each line of data in an input image according to FIG. 13. During a forward scan 160, 162, background color estimation 160 and glyph pixel selection 162 may be performed. At completion of the forward scan, a backward 164, 166 scan may re-estimate 166 background color using the prior estimate from the forward scan as a reference. The final glyph mask may also be computed 164.

Figure 14:
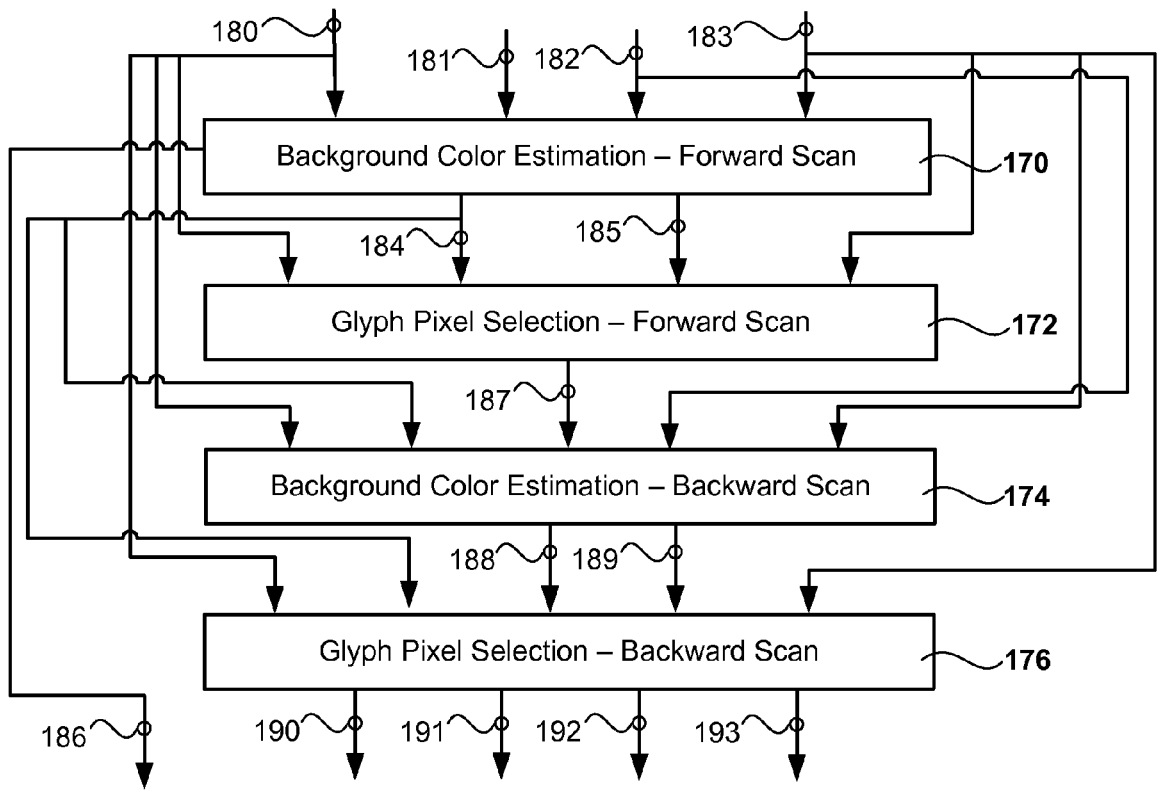
FIG. 14 is a diagram showing data dependencies between forward-scan background color estimation, forward-scan glyph-pixel selection, backward-scan background color estimation, backward-scan glyph-pixel selection embodiments of the present invention.

Data dependencies between the forward scan and the backward scan for some embodiments of the present invention may be illustrated in relation to FIG. 14. The forward-scan background color estimation 170 may generate a refined background class map 185, a forward-scan background color estimate 184 and a text density map 186 indicative of the density of text pixels in an image region. These outputs 184, 185, 186 may depend on an initial class map 181, an initial glyph mask 183, an initial edge map 182 and an input image 180. The forward-scan glyph pixel selection 172 may generate an updated class map 187 with forward-scan glyph pixels added. This output 187 may depend on the input image 180, the forward-scan background color estimate 184, the initial glyph mask 183 and the refined background class map 185. The backward-scan background color estimation 174 may generate an updated class map 188 with refined backward-scan background labels and a backward-scan background color estimate 189. These outputs 188, 189 may depend on the input image 180, the forward-scan background color estimate 184, the initial glyph mask 183, the updated class map 187 and the initial edge map 182. The backward-scan pixel selection 176 may generate a final binary glyph mask 190, a final "unknown" binary mask 191, a final background color estimate 192 and a glyph color estimate 193. These outputs 190, 191, 192 and 193 may depend on the input image 180, the forward-scan background color estimate 184, the backward-scan background color estimate 189, the initial glyph mask 183 and the updated class map 188 from the backward-scan background color estimation.

In some embodiments of the present invention, the input image 180 may be a color image in an Lab color space at a first resolution. In these embodiments, the initial edge map 182 may be at the same resolution as the input image 180, and the initial glyph map 183 may be a lower, second resolution image derived from a low resolution text map which may have been preprocessed to remove lines. The initial class map 181 may be at the second resolution, and the refined background class map 185 may be generated at the first resolution. The final binary glyph mask 190 and the final "unknown" binary mask 191 may be generated at the first resolution. The final background color estimate 192 and the glyph color estimate 193 may be generated at the second, lower resolution in these embodiments.

In some embodiments of the present invention, inputs to the glyph and background estimation modules may comprise an input color image, an initial text segmentation map, and a label image identifying pixels in a set of dominant colors. These inputs need not be at the same resolution. Computational, speed and memory advantages may be obtained by using different resolutions.

In some embodiments of the present invention, the input label image may be preprocessed to reduce artifacts or noise in the label image. Exemplary preprocessing may comprise filling-in labels behind text candidate pixels or removing small, isolated label clusters.

In some embodiments of the present invention, the input initial text map may be computed by edge detection operators which may discriminate between edge responses in halftone and pictorial regions and those edge responses due to text. In some embodiments, interiors of characters may not be included in the initial text map, and edges may not be localized to the actual text pixels. In some embodiments, morphology operations may be applied to a candidate text map to achieve filling-in of characters below a size threshold and to expand away from text characters to include both fringe and interior character pixels. In some embodiments, interiors of larger-sized characters may be recovered in the final glyph mask.

In some embodiments of the present invention, a glyph selection process may rely on a background color estimate to detect glyph pixels with minimal contamination of the transition pixels that may surround the glyph. A dynamic threshold test may be used to detect glyphs with minimal background or transition pixels.

In some embodiments of the present invention, accurate estimation of a background color may comprise color estimation based on pixels sufficiently away from the glyph to minimize the impact of the transition pixels which may surround the glyph. Some embodiments of the present invention may comprise global color estimation to determine a set of global colors and a label image indicating which pixels fall into each global color class.

Some embodiments of the present invention may comprise storage for the latest samples of colors for each global background label. In some embodiments of the present invention, the storage may comprise buffers of which each buffer may store color history for a single background label. In some embodiments, an additional buffer may be used to store a local average of all recent local background pixels.

In some embodiments of the present invention, the input image may be an image in a luminance-chrominance-chrominance color-space (e.g., CIE Lab). In these embodiments, the color buffers may be initialized to white, represented as (255, 128, 128). These initial colors may be replaced by image colors as the image is scanned at the input image resolution. For computational reasons it may be preferable, in some embodiments of the present invention, to maintain color summations of the buffer contents. In alternative embodiments, the color summations used to form the summary buffer may be computed as needed when a buffer value is to be output. In embodiments comprising maintenance of color summation values, the color summation values may also be initialized to white (e.g., BUFFER_SIZE*(255, 128, 128)).

In some embodiments of the present invention, the buffer states may be maintained as shift buffers where pixel color data flows through the buffer. In these embodiments, a pixel color value may be added at one end of a buffer, and pixel color values may shifted toward the other end until they are removed from the buffer. The color summation of a buff may be updated by subtracting the pixel values that were removed from the buffer and adding the new pixel values. In some embodiments, a color history buffer may be a multiple of two in size. In these embodiments, the average may be obtained by a shift of the values in the color summation. In some embodiments of the present invention, the color history buffers may have BUFFERSIZE=8. In these embodiments, a buffer average may be a shift of the buffer sum by three bits.

In alternative embodiments of the present invention, an index into the pixel color history to mark the oldest pixel in the buffer may be used. In these embodiments, the index may be updated after every pixel is added thereby effectively shifting the index through the buffer. Denoting this index asIdx_CH, the update logic for the index may be Idx_CH=(Idx_CH+1)%8. The modulus operation may be used to rotate the index back to the beginning of the buffer once it has indexed beyond the last element.

Some embodiments of the present invention may comprise color distance measurements. Distance between colors may be measured using a Euclidean metric, a city-block metric, a weighted distance metric or other distance metric.

In some embodiments of the present invention, the input label image 181 may include a label corresponding to an "unknown" classification. In these embodiments, pixels labeled as "unknown" may trigger different background estimation processing than pixels labeled as being of a frequently-occurring color. In some embodiments, "unknown" pixels in the label image may be used to mark areas believed to be text. In these embodiments, pixels marked as "unknown" may be bypassed when updating the color history buffers.

In some embodiments of the present invention, a text-density feature may be used to allow local background estimation to adapt to unknown local background areas while avoiding adaptation in glyph areas. The text-density feature value may be incremented when text is encountered and decremented when no text is found. Text-density feature values that have decayed to zero may indicate that no text pixels were found in recent memory. In some embodiments, background color estimation may adapt when the text-density feature value has decayed to zero even if the pixels are "unknown." This feature may allow recovery of missed glyphs in unknown local background areas while avoiding adapting the background to large character glyph colors for many font sizes.

In some embodiments of the present invention, the text density feature may be computed for the forward scan according to:

$$TextD=Max(TextDen[r,c-1],TextDen[r-1,c]);$$

$$TextD=roi\_0[r,c]||GlyphSel[r\_75,c\_75]?TextD+TextCnt:TextD-TextDecay;$$

$$TextD=TextD>TextCntLimit?TextCntLimit:TextD;$$

$$TextD=TextD<0?0:TextD;$$

$$TextDen[r,c]=TextD;$$

where, in some embodiments, roi_0 may correspond to a high resolution edge map 182 and GlyphSel may correspond to a lower resolution refined text map 183. TextCntLimit and TextDecay may be control parameters for controlling a saturation limit and a decay rate for the text density feature.

For the backward scan, initialization of the TextDen variable may be according to Max(TextDen[r,c+1],TextDen[r-1,c]) switching from left to right neighbor to the current pixel.

Figure 15:
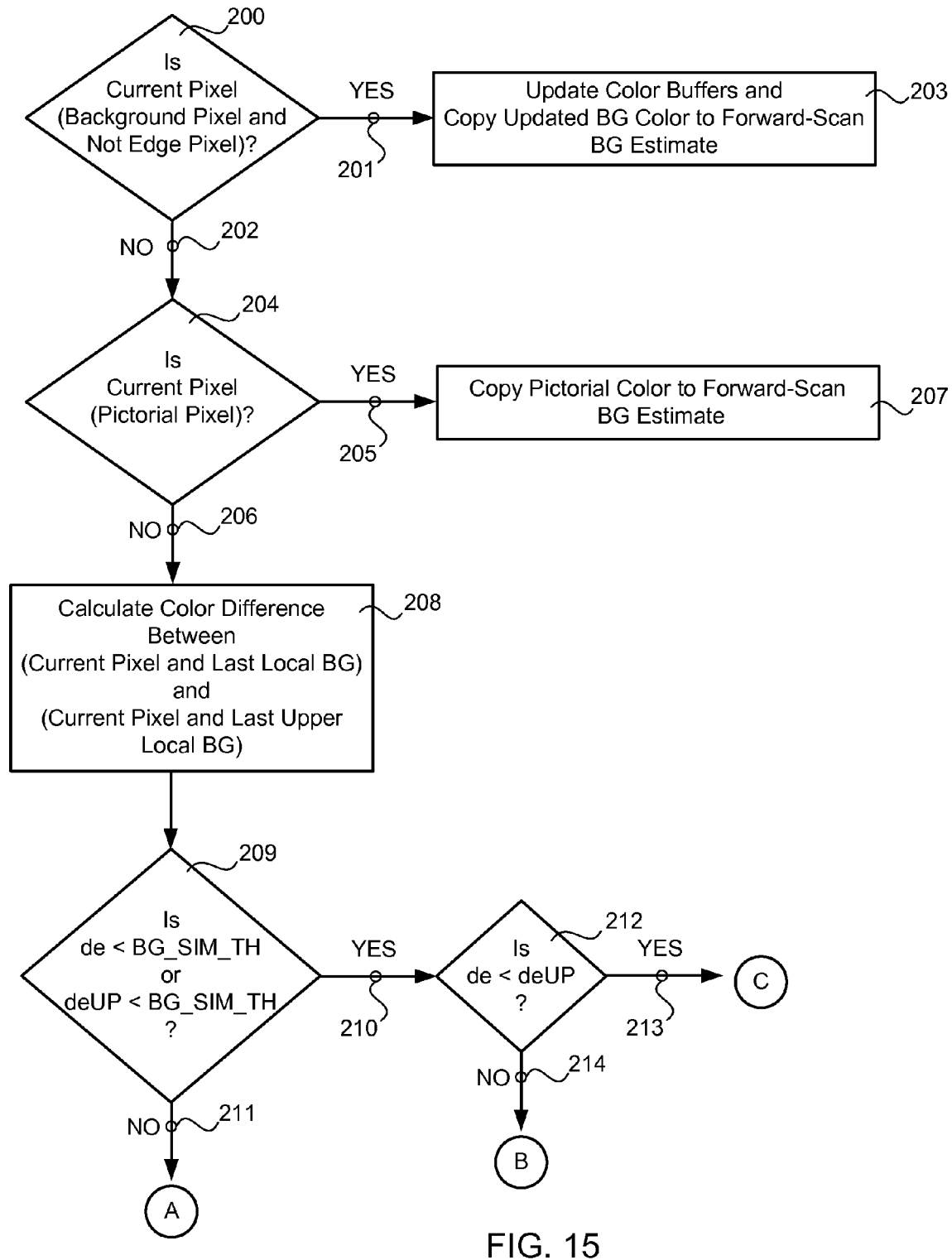
FIG. 15 is a diagram showing embodiments of the present invention comprising forward-scan background color estimation.
Figure 15:
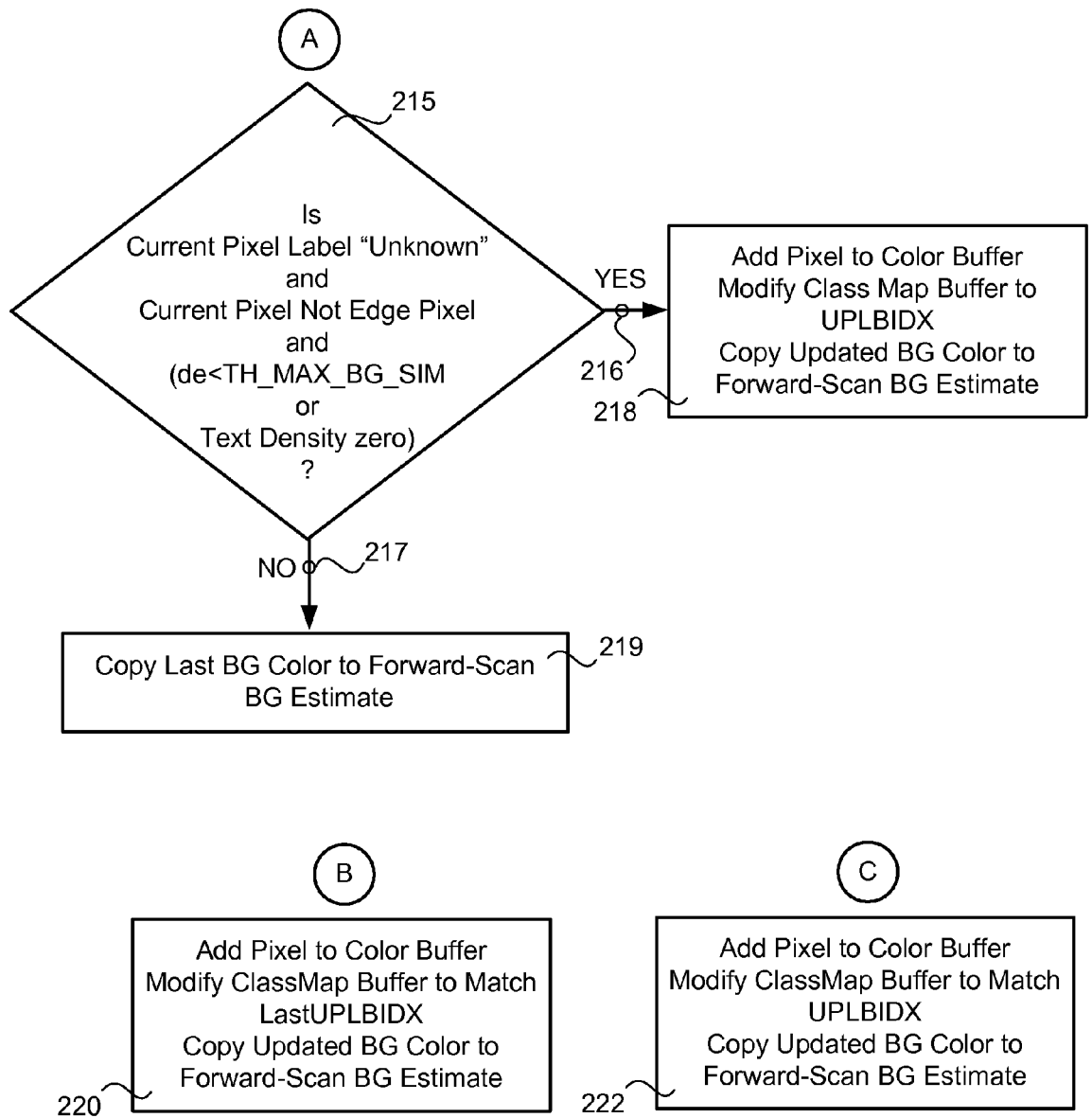

In some embodiments of the present invention, a background color may be estimated at every pixel in an image 180 during the forward scan. In some embodiments of the present invention, the background color estimate may adapt to "unknown"-label pixel colors if text-density-related conditions are met. In some embodiments of the present invention, background estimates may be filled using background estimates from a previous scan line. These embodiments of the present invention may be described in relation to FIG. 15.

The current pixel may be examined 200 to determine if it is a valid local background pixel and not an edge pixel based on the value obtained from the input initial edge map 182. If the current pixel is a valid local background pixel and not an edge pixel 201, then the color history buffers may be updated and a new background (BG) color estimate at this pixel position may be generated based on the color history buffers 203.

If the current pixel is not a valid background pixel or the current pixel is an edge pixel 202, then a pictorial map 181, which may be output from a previous processing module to indicate when a non-text pictorial region has been entered, may be examined 204 to determine if the current pixel is a pictorial pixel. If the current pixel is determined to be a pictorial pixel 205, then, in some embodiments, the pictorial color may be copied to the background (BG) estimate for the current pixel 207. In alternative embodiments, a predefined color may be set as the background color estimate for the current pixel.

If the current pixel is determined not to be a pictorial pixel 206, then the color difference between the current pixel and the prior background color estimates may be calculated 208. In some embodiments, a color difference may be calculated as a color distance. A color history buffer may be selected and updated based on the color differences, and a color estimate may be output. In some embodiments, the color estimate may comprise an average color value calculated from the selected buffer. A color difference may be calculated between current pixel's color value and the last background color estimate on the current scan line and the current pixel's color value and the last background color estimate on the previous scan line (up). The color differences may be examined 209, and if the current pixel's color value is close to one of the prior background estimates 210, then the color value of the current pixel may be added to the color buffer and the label and color estimates may be updated. The color distance between the current pixel's color value and the last background color estimate on the current scan line (denoted de) may be compared 212 to the color distance between the current pixel's color value and the last background color estimate on the previous scan line (deUP). If de is less than deUP 213, then the current pixel color value may be added to the color buffer, and the color estimates may be updated based on the last background color estimate on the current scan line 222. If de is not less than deUP 214, then the current pixel color value may be added to the color buffer, and the color estimates may be updated based on the last background color estimate on the previous scan line 220.

If the current pixel fails to be merged with one of the prior estimates 211, the current pixel may be checked to see if it is unknown pixel and not an edge pixel 215. In these areas the pixel's color value may be checked to see if it is close enough to the last background estimate using a large color threshold difference (TH_MAX_BG_SIM) allowing for large variations in color to be used in the adaptation of the local background color estimate to the current pixels 215. The text density feature value may also be checked 215 to allow for aggressive adaptation in areas away from text. If these conditions are satisfied 216, then the current pixel's color value may be added to the color buffer, and the label and color estimates may be updated for the scan line 218. This may enable background color adaptation in local background areas missed by the initial global color-based labeling operation.

Otherwise, 217 the background-color estimate for the current pixel may be set to the last local background color estimate 219.

In some embodiments of the present invention, once a background color has been estimated for a current pixel in a forward scan, the current pixel may be test to see if it is a glyph pixel. The test may be applied selectively on the page using a glyph selection mask 183. Some embodiments of the present invention may maintain a separate initial text map 182 and glyph selection map 183 to allow for edge areas to be indicated in the text map 182 (thereby modulating local background color estimation) but for some of these edge pixels to not be considered in the final text map. This may enable the glyph generation module to ignore boundary regions rejected for example by a line or boundary edge detection mechanism. These embodiments of the present invention may be described in relation to FIG. 16 and FIG. 17.

Figure 16:
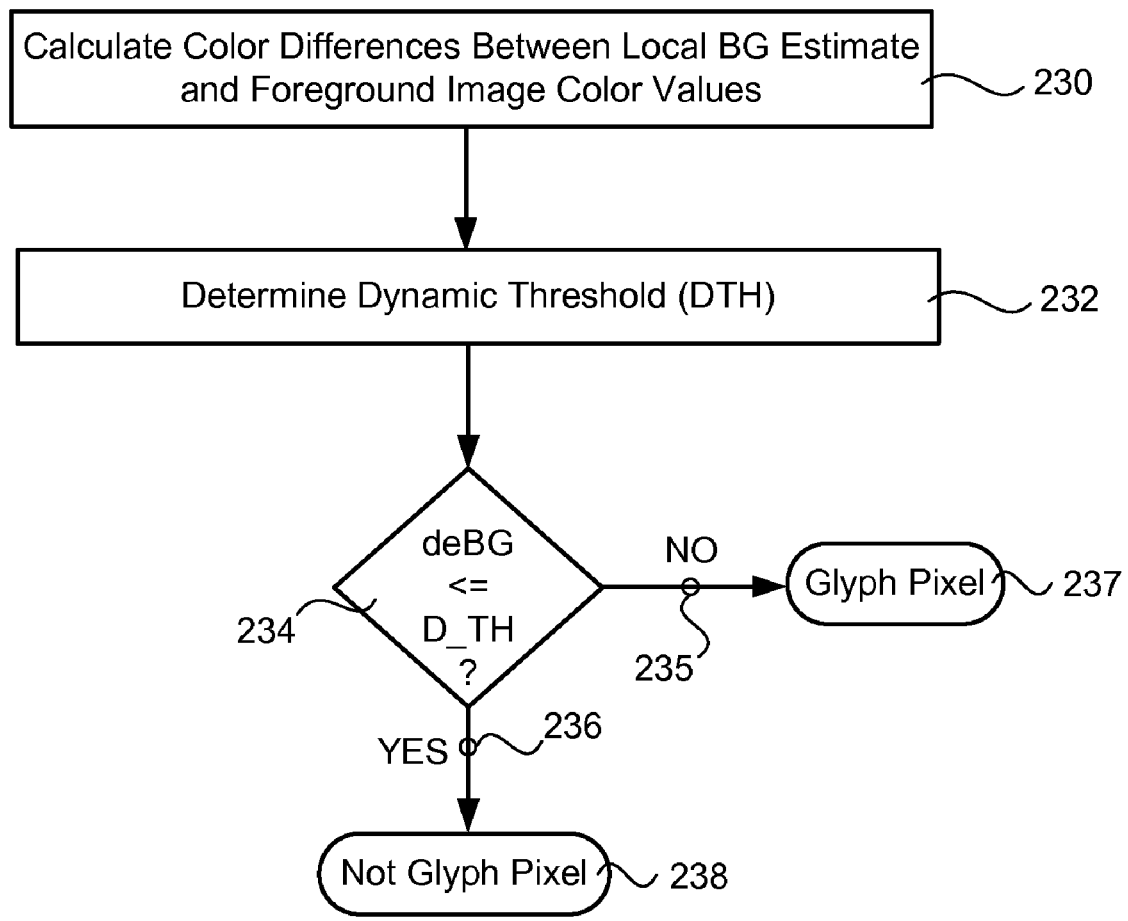
FIG. 16 is diagram showing embodiments of the present invention comprising forward-scan glyph-pixel selection.

In some embodiments of the present invention described in relation to FIG. 16, forward-scan glyph generation may first calculate color-difference statistics from the current background color estimate and the color values in a neighborhood of the input image 230. In some embodiments of the present invention, the neighborhood may comprise a rectangular neighborhood centered on the current pixel. In alternative embodiments, the neighborhood may comprise a circular region centered on the current pixel or other shaped region proximate to the current pixel. In some embodiments of the present invention, the distance of the current background color estimate from a page background color may be calculated (dePBG).

Exemplary color-difference statistics may comprise the minimum color difference (deMin), the maximum color difference (deMax), the average color difference (deAvg), the color distance between the background color value estimate and the color value at the center of the neighborhood in the image (deBG) and other statistics. In some embodiments of the present invention, a dynamic contrast threshold (D_TH) may be set based on the color-difference statistics 232. The color difference from the background color and the center pixel color value in the neighborhood (deBG) may be compared to the dynamic threshold (D_TH) 234. If the difference is less than the threshold 236, then the pixel may be considered a non-glyph pixel 238. If the difference is greater than the threshold 235, then the pixel may be labeled as a glyph pixel 237.

Figure 17:
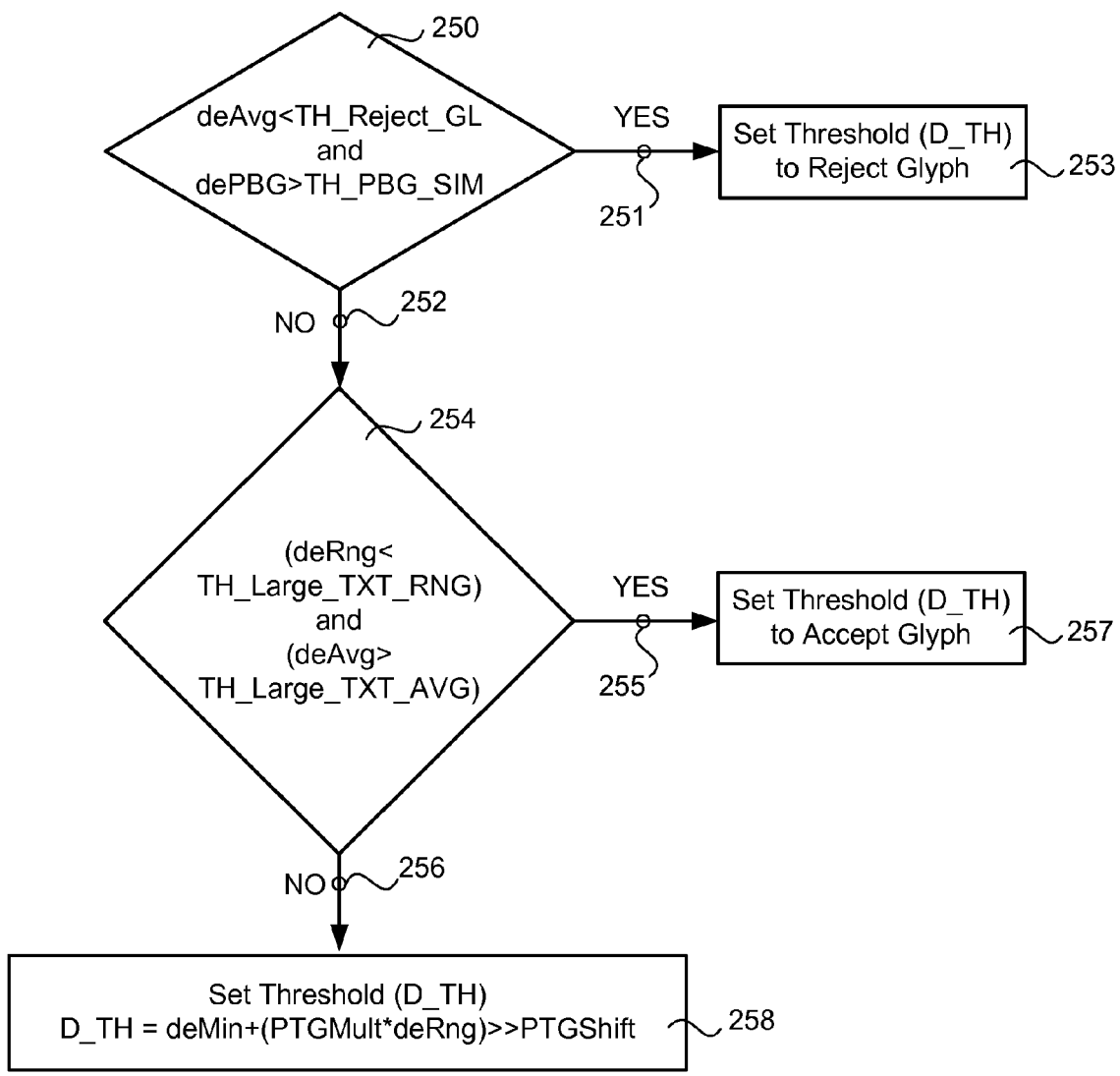
FIG. 17 is a diagram showing embodiments of the present invention comprising dynamic threshold determination.

In some embodiments of the present invention, the dynamic threshold may be calculated according to FIG. 17. The average color difference (deAvg) and the color difference from the page background color may be compared 250 to respective thresholds. If conditions are met 251 relative to the thresholds, then the dynamic threshold (D_TH) may be set to reject the glyph 253. In some embodiments, the dynamic threshold (D_TH) may be set to 3*255 in this case. If the conditions are not met 252, then the difference range (deRng) and the average difference (deAvg) may be compared 254 to respective thresholds. If the conditions are met 255 relative to the thresholds, then the dynamic threshold (D_TH) may be set to accept the glyph 257. In some embodiments, the dynamic threshold (D_TH) may be set to the minimum difference (deMin). If the conditions are not met 256, then the dynamic threshold (D_TH) may be set 258 according to:

$$D\_TH = de\text{Min} + (PTG\text{Mult} * de Rng) >> PTG\text{Shift},$$

where PTGMult and PTGShift may be used to define the percentage of the color difference range to add to deMin.

An alternative method for forward-scan glyph generation is disclosed in U.S. patent application Ser. No. 11/627,456, entitled "Methods and Systems for Detecting Character Content in a Digital Image," filed Jan. 26, 2007, which is hereby incorporated herein by reference in its entirety.

In some embodiments of the present invention, a backward scan may be used to formulate a more accurate background color estimate than is possible with a single scan. A multiple-pass algorithm may allow information to be propagated both leftward and rightward. Propagating information from both directions may eliminate a directional bias in the estimation procedure.

Figure 18:
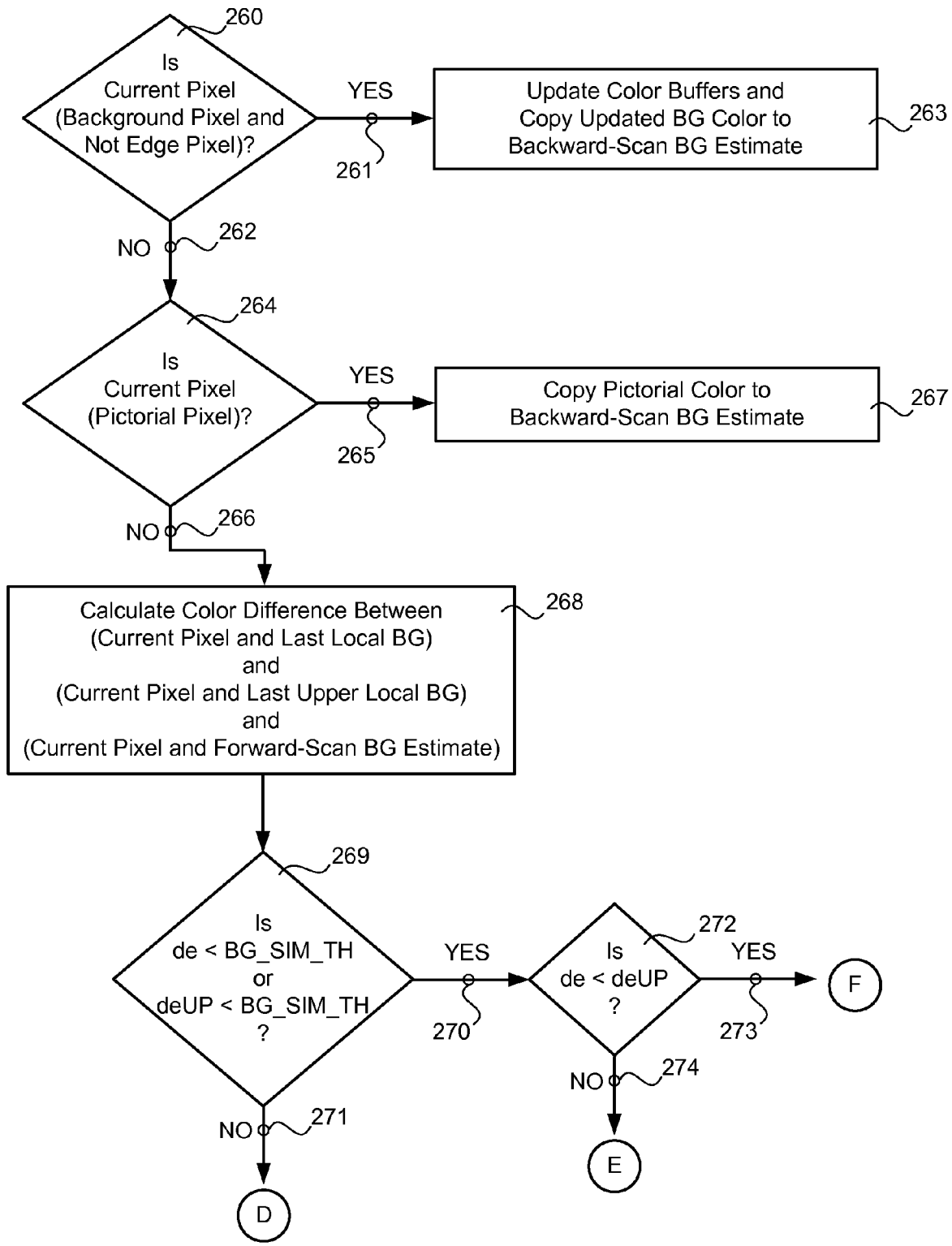
FIG. 18 is a diagram showing embodiments of the present invention comprising backward-scan background color estimation.
Figure 18:
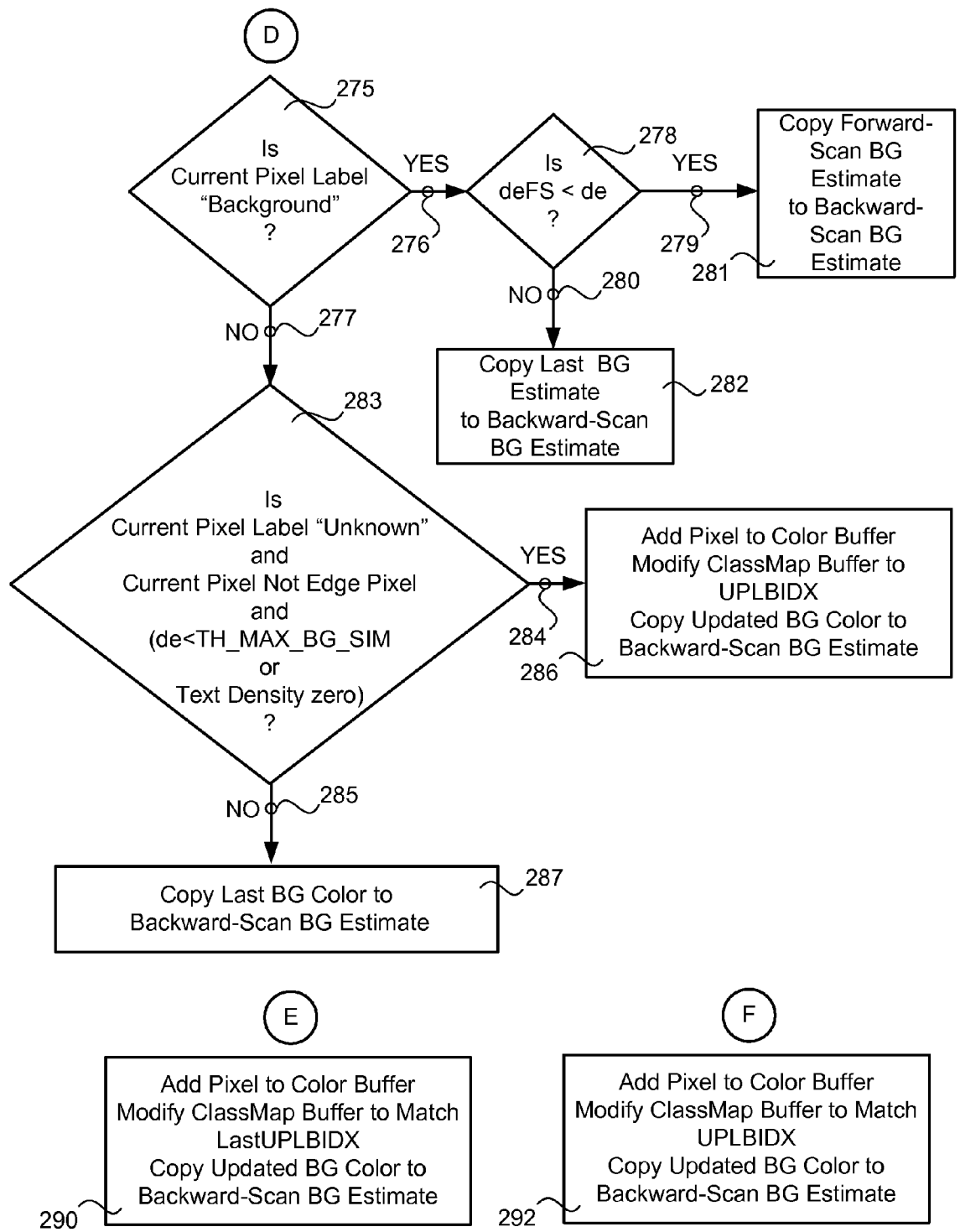

In some embodiments of the present invention, backward-scan background color estimation may be similar to the forward-scan background color estimation embodiments described above. In some embodiments of the present invention, a background color may be estimated at every pixel in an image 180 during a backward scan. In some embodiments of the present invention, the background color estimate may adapt to "unknown"-label pixel colors if text-density-related conditions are met. In some embodiments of the present invention, background estimates may be filled using background estimates from a previous scan line or the background color estimates from the forward scan. These embodiments of the present invention may be described in relation to FIG. 18.

The current pixel in the backward scan may be examined 260 to determine if it is a valid background pixel and not an edge pixel based on the value obtained from the input initial edge map 182. If the current pixel is a valid background pixel and not an edge pixel 261, then the color history buffers may be updated and a backward-scan background color estimate at this pixel position may be generated based on the color history buffers 263.

If the current pixel in the backward scan is not a valid background pixel or the current pixel is an edge pixel 262, then a pictorial map 181, which may be output from a previous processing module to indicate when a non-text pictorial region has been entered, may be examined 264 to determine if the current pixel in the backward scan is a pictorial pixel. If the current pixel is determined to be a pictorial pixel 265, then, in some embodiments, the pictorial color may be copied to the backward-scan background estimate for the current pixel 267. In alternative embodiments, a predefined color may be set as the backward-scan background color estimate for the current pixel.

If the current pixel in the backward scan is determined not to be a pictorial pixel 266, then, as in the forward scan, the color difference between the current pixel in the backward scan and the prior background color estimates may be calculated in addition to the color difference between the current pixel in the backward scan and the forward-scan background color estimate at the pixel location 268. In some embodiments, a color difference may be calculated as a color distance. A color history buffer may be selected and updated based on the color differences, and a color estimate may be output. In some embodiments, the color estimate may comprise an average color value calculated from the selected buffer. A color difference may be calculated between the current pixel's color value and the last background color estimate on the current scan line. This difference may be denoted de. A color difference may also be calculated between the current pixel's color value and the last background color estimate on the previous scan line (up). This difference may be denoted deUP. A color difference may also be calculated between the current pixel's color value and the background color value estimate from the forward scan. This difference may be denoted deFS. The color differences may be examined 269, and if the current pixel's color value is close to one of the prior background estimates 270, then the color value of the current pixel may be added to the color buffer and the label and color estimates may be updated. The color difference between the current pixel's color value and the last background color estimate on the current scan line (de) may be compared 272 to the color difference between the current pixel's color value and the last background color estimate on the previous scan line (deUP). If de is less than deUP 273, then the current pixel color value may be added to the color buffer, and the color estimates may be updated based on the last background color estimate on the current scan line 292. If de is not less than deUP 274, then the current pixel color value may be added to the color buffer, and the color estimates may be updated based on the last background color estimate on the previous scan line 290.

If the current pixel fails to be merged with one of the prior estimates 271, the current pixel may be checked 275 to see if it is labeled as a "background" pixel. If it is a "background" pixel 276, then the color difference between the current pixel's color value and the background color value estimate from the forward scan (deFS) may be compared 278 to the color difference between the current pixel's color value and the last background color estimate on the current scan line (de). If deFS is less than de 279, then the forward-scan background color estimate may be copied to the backward-scan background color estimate 281. If deFS is not less than de 280, then the last background estimate may be copied to the backward-scan background color estimate 282.

If the current pixel is not a "background" pixel 277, then the current pixel may be checked to see if it is unknown pixel and not an edge pixel 283. In these areas the pixel's color value may be checked to see if it is close enough to the last background estimate using a large color threshold difference (TH_MAX_BG_SIM) allowing for large variations in color to be used in the adaptation of the local background color estimate to the current pixels 283. The text density feature value may also be checked 283 to allow for aggressive adaptation in areas away from text. If these conditions are satisfied 284, then the current pixel's color value may be added to the color buffer, and the label and color estimates may be updated for the scan line 286. This may enable background color adaptation in local background areas missed by the initial global color-based labeling operation.

Figure 19:
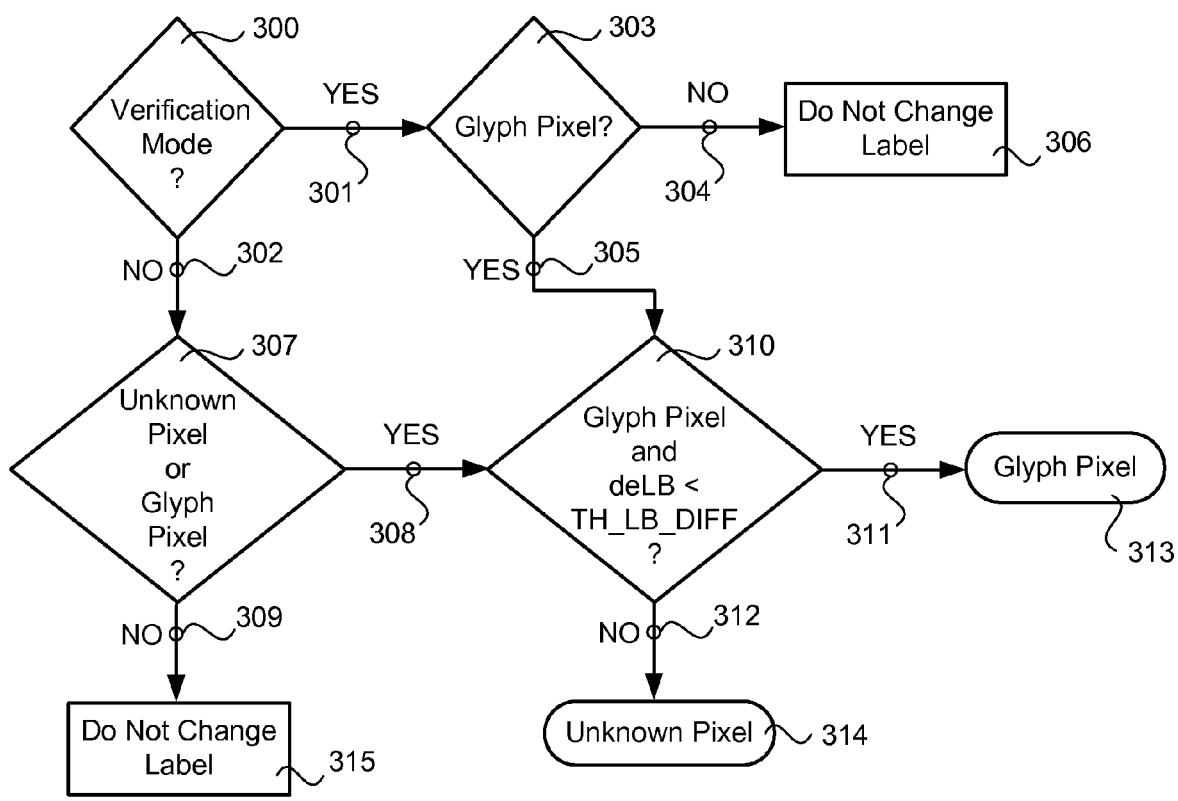
FIG. 19 is a diagram showing embodiments of the present invention comprising backward-scan glyph-pixel selection.

In some embodiments of the present invention, a glyph pixel test may be applied in the backward scan. Some embodiments of the backward-scan glyph pixel test may be described in relation to FIG. 19. In some embodiments of the present invention, the backward-scan may be placed 300 into one of two fundamental modes depending on the behavior of the system.

The rate of false positives (non-text pixels being marked as glyph) may be addressed by entering a verification mode 301. In verification mode 301, no new glyph pixels may be added by backward-scan, and glyph pixels identified in the forward-scan may be checked to confirm that the pixel is a glyph pixel. This may be considered a stricter criterion for a pixel being identified as a glyph pixel. Both the forward and backward scan must indicate pixel is glyph before it may be labeled glyph. This stricter test may reduce the false positives but may cause some small holes in glyphs. In some embodiments of the verification mode, the current pixel label may be examined 303 to determine if it is a glyph pixel. If it is not 304, then the pixel label may not be changed 306. If the pixel is labeled as a glyph pixel 305, then the color difference between the background estimate and the pixel's color value may be compared 310 to a similarity threshold. If the color difference is larger than the threshold 311, then the pixel may be labeled a glyph pixel 313. If the difference is not larger than the threshold 312, then the pixel may labeled an "unknown" pixel 314.

The rate of missed glyph pixels (text pixels not marked as glyph) may be addressed by entering a glyph-addition mode 302. In glyph-addition mode 302, previous glyph pixels and "unknown" pixels may both be tested. The current pixel label may be examined 307 to determine if the pixel is labeled as an "unknown" pixel or a glyph pixel. If the pixel is not labeled 309 as an "unknown" pixel or a glyph pixel, then the pixel label may not be changed 315. If the pixel is labeled 308 as an "unknown" pixel or a glyph pixel, then a test condition 310 may be applied which may improve the rejection of glyph false positives at the boundaries between two local backgrounds, where there may be a strong edge signal. When a local background boundary is encountered, a discrepancy may exist between the forward-scan and backward-scan local background estimates. In some embodiments, an additional test 310 may check the color difference (deLB) between the forward-scan color estimate LB_FS and backward-scan color estimate LB_BS. If the estimates are different 311, then the pixel may be labeled as unknown. For stable background color estimates, LB_FS and LB_BS may be in agreement, and the glyph pixel label may be accepted 313. This test condition may improve glyph generation processing's ability to reject glyphs in unreliable areas and at boundaries.

In some embodiments of the present invention, the background color summary and glyph color summary images may be output for use by subsequent processing modules. One exemplary use of these output images may be for additional verification of the glyph mask. Particularly in complex documents, the glyph mask may contain errors. In some embodiments, to minimize the impact of these errors, subsequent processing may be applied to verify or add to the glyph mask. In some embodiments, glyph generation may be a high resolution process that may make fine scale decisions, but it may lack the context of a large portion of the page. This may make resolving large text and identifying certain types of errors difficult in forward-scan glyph determination and backward-scan glyph determination. In some embodiments, in addition to the output background and text color results, additional features about the colors may be computed as the estimates are formulated. In these embodiments, statistics may be gathered for the pixels within lower resolution blocks. Exemplary statistics may comprise the glyph color corresponding to a maximum luminance value, glyph color corresponding to a minimum luminance value, local background color corresponding to a maximum luminance value, local background color corresponding to a minimum luminance value, the count of normal text pixels in the block, and the count of reverse pixel in the block.

Some embodiments of the present invention may comprise both forward-scan and backward scan color estimation and glyph determination. Alternative embodiments of the present invention may comprise single-pass color estimation and glyph determination.

The terms forward-scan and backward-scan may refer to a first scan direction and pattern and a second scan direction and pattern. Exemplary scan directions and patterns may comprise those associated with a horizontal raster scan, a vertical raster scan, a horizontal serpentine scan, a vertical serpentine scan, a downward diagonal raster scan, a downward diagonal serpentine scan, an upward diagonal raster scan, an upward diagonal serpentine scan and other scans.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for glyph detection in a digital image, said method comprising:
    determining a pixel of interest in a digital image, wherein said pixel of interest is part of a first scan line with an associated first scan direction in said digital image;
    receiving a first background color estimate for said pixel of interest;
    receiving a pixel-of-interest color value for said pixel of interest;
    receiving a color value for each pixel in a first plurality of pixels in a region proximate to said pixel of interest, thereby producing a first plurality of color values;
    calculating a first color difference between said pixel-of-interest color value and said first background color estimate;
    calculating a color difference between said first background color estimate and each color value in said first plurality of color values, thereby producing a first plurality of color differences;
    determining a dynamic threshold based on said first plurality of color differences;
    comparing said dynamic threshold with said first color difference;
    labeling said pixel of interest as a glyph pixel when said comparing meets a first condition; and
    labeling said pixel of interest as a non-glyph pixel when said comparing meets a second condition.

2. A method according to claim 1, wherein:
    said calculating a first color difference comprises calculating a first color distance between said pixel-of-interest color value and said first background color estimate; and
    said calculating a color difference between said first background color estimate and each color value in said first plurality of color values comprises calculating a color distance between said first background color estimate and each color value in said first plurality of color values.

3. A method according to claim 1, wherein said determining a dynamic threshold comprises:
    determining a range of said first plurality of color differences; and
    computing an average of said first plurality of color differences.

4. A method according to claim 3 further comprising:
    receiving a page background color value estimate; and
    computing a page-value color difference between said page background color value estimate and said pixel-of-interest color value.

5. A method according to claim 4, wherein said determining a dynamic threshold further comprises setting said dynamic threshold to a rejection value when said average and a first threshold meet a third condition and said page-value color difference and a second threshold meet a fourth condition, thereby meeting a fifth condition.

6. A method according to claim 5, wherein said pixel-of-interest color value comprises a plurality of color channels and said rejection value is the summation of the maximum of each of said plurality of color channels.

7. A method according to claim 5, wherein said determining a dynamic threshold further comprises setting said dynamic threshold to an acceptance value when said fifth condition is not met and said range and a third threshold meet a sixth condition and said average and a fourth threshold meet a seventh condition.

8. A method according to claim 7, wherein said acceptance value is said minimum of said first plurality of color differences.

9. A system for glyph detection in a digital image, said system comprising:
    in a computing device, a pixel-of-interest selector for determining a pixel of interest in a digital image, wherein said pixel of interest is part of a first scan line with an associated first scan direction in said digital image;
    in said computing device, a first background-color receiver for receiving a first background color estimate for said pixel of interest;
    in said computing device, a pixel-of-interest color value receiver for receiving a pixel-of-interest color value for said pixel of interest;
    in said computing device, a color value receiver for receiving a color value for each pixel in a first plurality of pixels in a region proximate to said pixel of interest, thereby producing a first plurality of color values;
    in said computing device, a first difference calculator for calculating a first color difference between said pixel-of-interest color value and said first background color estimate;
    in said computing device, a color difference calculator for calculating a color difference between said first background color estimate and each color value in said first plurality of color values, thereby producing a first plurality of color differences;
    in said computing device, a dynamic threshold determiner for determining a dynamic threshold based on said first plurality of color differences;
    in said computing device, a threshold comparator for comparing said dynamic threshold with said first color difference; and
    in said computing device, a classifier for labeling said pixel of interest as a glyph pixel when said comparing meets a first condition and for labeling said pixel of interest as a non-glyph pixel when said comparing meets a second condition.

10. A system according to claim 9, wherein:
said first difference calculator comprises a first distance calculator for calculating a first color distance between said pixel-of-interest color value and said first background color estimate; and
said color difference calculator comprises a color distance calculator for calculating a color distance between said first background color estimate and each color value in said first plurality of color values.

11. A system according to claim 9, wherein said dynamic threshold determiner comprises:
a range determiner for determining a range of said first plurality of color differences; and
an averager for computing an average of said first plurality of color differences.

12. A system according to claim 11 further comprising:
a page-background-color receiver for receiving a page background color value estimate; and
a page-background difference calculator for computing a page-value color difference between said page background color value estimate and said pixel-of-interest color value.

13. A system according to claim 12, wherein said dynamic threshold determiner sets said dynamic threshold to a rejection value when said average and a first threshold meet a third condition and said page-value color difference and a second threshold meet a fourth condition, thereby meeting a fifth condition.

14. A system according to claim 13, wherein said pixel-of-interest color value comprises a plurality of color channels and said rejection value is the summation of the maximum of each of said plurality of color channels.

15. A system according to claim 13, wherein said dynamic threshold determiner sets said dynamic threshold to an acceptance value when said fifth condition is not met and said range and a third threshold meet a sixth condition and said average and a fourth threshold meet a seventh condition.

16. A system according to claim 15, wherein said acceptance value is said minimum of said first plurality of color differences.

17. A method for glyph detection in a digital image, said method comprising:
determining a pixel of interest in a digital image;
receiving a label value associated with said pixel of interest;
receiving a first-scan background color estimate for said pixel of interest;
receiving a second-scan background color estimate for said pixel of interest;
calculating a background-color difference between said first-scan background color estimate and said second-scan background color estimate; and
changing said label value from said label value to a second label value when said background-color difference meets a first condition.

18. A method according to claim 17 further comprising updating a first color buffer with a color value associated with said pixel of interest when said background-color difference meets a first condition.

19. A method according to claim 18 further comprising associating a glyph pixel color with said pixel of interest, wherein said glyph pixel color is based on the contents of said first color buffer.

20. A method according to claim 17, wherein said calculating said background-color difference comprises calculating a color distance between said first-scan background color estimate and said second-scan background color estimate.

21. A method according to claim 17, wherein said first-scan background color estimate corresponds to a first scan direction and said second-scan background color estimate corresponds to a second scan direction.

22. A method according to claim 21, wherein said first-scan direction is a forward-scan direction and said second-scan direction is a backward-scan direction.

* * * * *